US012578489B2

(12) United States Patent
Hood et al.

(10) Patent No.: US 12,578,489 B2
(45) Date of Patent: Mar. 17, 2026

(54) RADIATION DOSIMETRY METHOD

(71) Applicant: ISP Investments LLC, Wilmington, DE (US)

(72) Inventors: David K. Hood, Basking Ridge, NJ (US); Mark Allen Davies, Scotch Plains, NJ (US)

(73) Assignee: ISP Investments LLC

( * ) Notice: Subject to any disclaimer, the term of this patent is extended or adjusted under 35 U.S.C. 154(b) by 66 days.

(21) Appl. No.: 18/269,229

(22) PCT Filed: Dec. 22, 2021

(86) PCT No.: PCT/US2021/064975
§ 371 (c)(1),
(2) Date: Jun. 22, 2023

(87) PCT Pub. No.: WO2022/140615
PCT Pub. Date: Jun. 30, 2022

(65) Prior Publication Data
US 2024/0053499 A1 Feb. 15, 2024

Related U.S. Application Data

(60) Provisional application No. 63/129,816, filed on Dec. 23, 2020.

(51) Int. Cl.
*G01T 7/00* (2006.01)
*G01N 21/65* (2006.01)
*G01T 1/02* (2006.01)

(52) U.S. Cl.
CPC ............. *G01T 7/005* (2013.01); *G01N 21/65* (2013.01); *G01T 1/02* (2013.01)

(58) Field of Classification Search
CPC .. G01T 7/005; G01T 1/02; G01T 1/04; G01N 21/65
See application file for complete search history.

(56) References Cited

U.S. PATENT DOCUMENTS 3,053,983 A 9/1962 Faulkner, Jr.
3,894,238 A 7/1975 Cox
(Continued)

FOREIGN PATENT DOCUMENTS

CN 201392401 Y 1/2010
CN 103097912 A 5/2013
(Continued)

OTHER PUBLICATIONS

Aoymda et al., "High Accuracy Measurement System of Absorbed Dose Using Combination of Radiochromic Film and Micro-Densitometer for Radiation Therapy",—Instrumentation and Measurement Technology Conference Sorrento, Italy Apr. 24-27, 2006, 6 pages. (Year: 2006).*

(Continued)

*Primary Examiner* — Kiho Kim
(74) *Attorney, Agent, or Firm* — Aseem V. Mehta; Nathalie Tietcheu

(57) ABSTRACT

Methods and computing apparatus for implementing a radiation dosimetry process. An example process may include exposing a first radiation sensitive film to a series of known doses of radiation, measuring a first set of radiation data with a measurement device, and determining a calibration curve. The calibration curve may be determined by selecting Raman spectral ranges based on the first set of radiation data, determining a plurality of band area ratios, and generating the calibration curve based on plotting the band areas and ratios compared to known dose. The radiation dosimetry process then exposes a second radiation sensitive film to an unknown dose of radiation, measures a second set of radiation data for the second radiation sensitive film with the measurement device, and determines a dose exposure level for the second radiation sensitive film by comparing the second set of radiation data with the calibration curve.

30 Claims, 9 Drawing Sheets

(56) References Cited

U.S. PATENT DOCUMENTS

| | | | |
|---|---|---|---|
| 4,001,587 | A | 1/1977 | Panchenkov et al. |
| 4,536,450 | A | 8/1985 | Garito |
| 5,051,597 | A | 9/1991 | Lewis et al. |
| 5,084,623 | A | 1/1992 | Lewis et al. |
| 5,637,876 | A | 6/1997 | Donahue |
| 6,040,191 | A | 3/2000 | Grow |
| 7,445,880 | B2 | 11/2008 | Anyumba et al. |
| 7,476,874 | B2 | 1/2009 | Patel |
| 8,115,182 | B1 | 2/2012 | Patel |
| 8,242,464 | B1 | 8/2012 | Patel |
| 8,575,572 | B2 | 11/2013 | Yoder et al. |
| 8,604,415 | B2 | 12/2013 | Micke |
| 8,872,134 | B2 | 10/2014 | Patel |
| 9,833,214 | B2 | 12/2017 | Imamura |
| 10,060,786 | B2 | 8/2018 | Lewin et al. |
| 10,260,955 | B2 | 4/2019 | Freysz |
| 2003/0204336 | A1 | 10/2003 | Ritt |
| 2005/0208290 | A1 | 9/2005 | Patel |
| 2005/0285050 | A1 | 12/2005 | Bruce |
| 2006/0134551 | A1 | 6/2006 | Anyumba et al. |
| 2009/0224176 | A1 | 9/2009 | Patel |
| 2010/0176308 | A1 | 7/2010 | Yu et al. |
| 2010/0213362 | A1 | 8/2010 | Lewis et al. |
| 2011/0084213 | A1 | 4/2011 | Boudouris et al. |
| 2011/0178379 | A1* | 7/2011 | Dudhia ................ A61B 5/0086 514/42 |
| 2012/0181453 | A1 | 7/2012 | Patel |
| 2015/0041632 | A1 | 2/2015 | Lewis et al. |
| 2015/0182119 | A1* | 7/2015 | Crane .................. A61B 5/0084 600/407 |
| 2016/0198999 | A1 | 7/2016 | Dieckmann et al. |
| 2016/0290859 | A1 | 10/2016 | Yu et al. |
| 2018/0259654 | A1 | 9/2018 | Short |

FOREIGN PATENT DOCUMENTS

| | | | |
|---|---|---|---|
| CN | 104662443 | A | 5/2015 |
| GB | 1480618 | A | 7/1977 |
| GB | 2528492 | A1 | 1/2016 |
| JP | 1993-504839 | A2 | 7/1993 |
| JP | 2007-003463 | A2 | 1/2007 |
| JP | 2013-524238 | A2 | 6/2013 |
| KR | 20200115049 | A | 10/2020 |
| WO | WO1997017595 | A1 | 5/1997 |
| WO | WO2002024277 | C2 | 8/2002 |
| WO | 2004017095 | A2 | 2/2004 |
| WO | WO2011126725 | A1 | 10/2011 |
| WO | WO2016012620 | A1 | 1/2016 |
| WO | 2017054008 | A1 | 3/2017 |

OTHER PUBLICATIONS

International Search Report of the international application No. PCT/US 2021/064975 published on Jun. 30, 2022.

Mirza, et al. Characterization of radiochromic films as a micrometer-resolution dosimeter by confocal Raman spectroscopy. : Medical Physics 46.11 (2019): 5238-5248.

Baldock et al. Fourier transform Raman spectroscopy of polyacrylamide gels (PAGs) for radiation dosimetry. Phys. Med. Biol. 43 (1998) 3617-3627. [retrieved from the Internet: Feb. 25, 2022] <URL: https://www.academia.edu/22722281/Fourier_transform_Raman_spectroscopy_of_polyacrylami de_gels_PAGs_for_radiation_dosimetry> entire document.

Mirza, et al. Use of radiochromic film as a high-spatial resolution dosimeter by Raman spectroscopy. Medical Physics, 43(8Part1), (2016), 4520-4528. [retrieved from the Internet Feb. 28, 2022] <URL: https://sci-hub.se/https://doi.org/10.1118/1.4955119> entire document.

Talarico Olga S. et al: "3 radiochromic dosimetry film", Medical Physics., vol. 46, No. 4, Feb. 18, 2019 (Feb. 18, 2019), US, pp. 1883-1887, XP093207066, ISSN: 0094-2405, Retrieved from the Internet <URL:https://onlinelibrary.wiley.com/doi/full-XML/10.1002/mp.13423> [retrieved on Sep. 20, 2024], DOI: 10.1002/mp.13423.

Kozicki Marek et al: "Flat foils as UV and ionising radiation dosimeters", Journal of Photochemistry, vol. 351, Oct. 16, 2017 (Oct. 16, 2017), pp. 179-196, XP085278874, ISSN: 1010-6030, DOI: 10.1016/J.JPHOTOCHEM.2017.10.028.

* cited by examiner

*200*

*500*

| Appropriate a first radiation sensitive film | ⌐ *510* |

↓

| Expose the first radiation sensitive film to a series of known doses of radiation | ⌐ *520* |

↓

| Measure a first set of radiation data of the first radiation sensitive film with a measurement device | ⌐ *530* |

↓

| Generate a calibration curve based on the first set of radiation data of the first radiation sensitive film at a user device | ⌐ *540* |

↓

| Expose a second radiation sensitive film to an unknown dose of radiation | ⌐ *550* |

↓

| Determine a second set of radiation data of the second radiation sensitive film based on the calibration curve | ⌐ *560* |

↓

| Provide the second set of radiation data of the second radiation sensitive film for display on the user device | ⌐ *570* |

↓

| Enable data transfer of the second set of radiation data of the second radiation sensitive film and the calibration curve to a data management system | ⌐ *580* |

FIG. 5

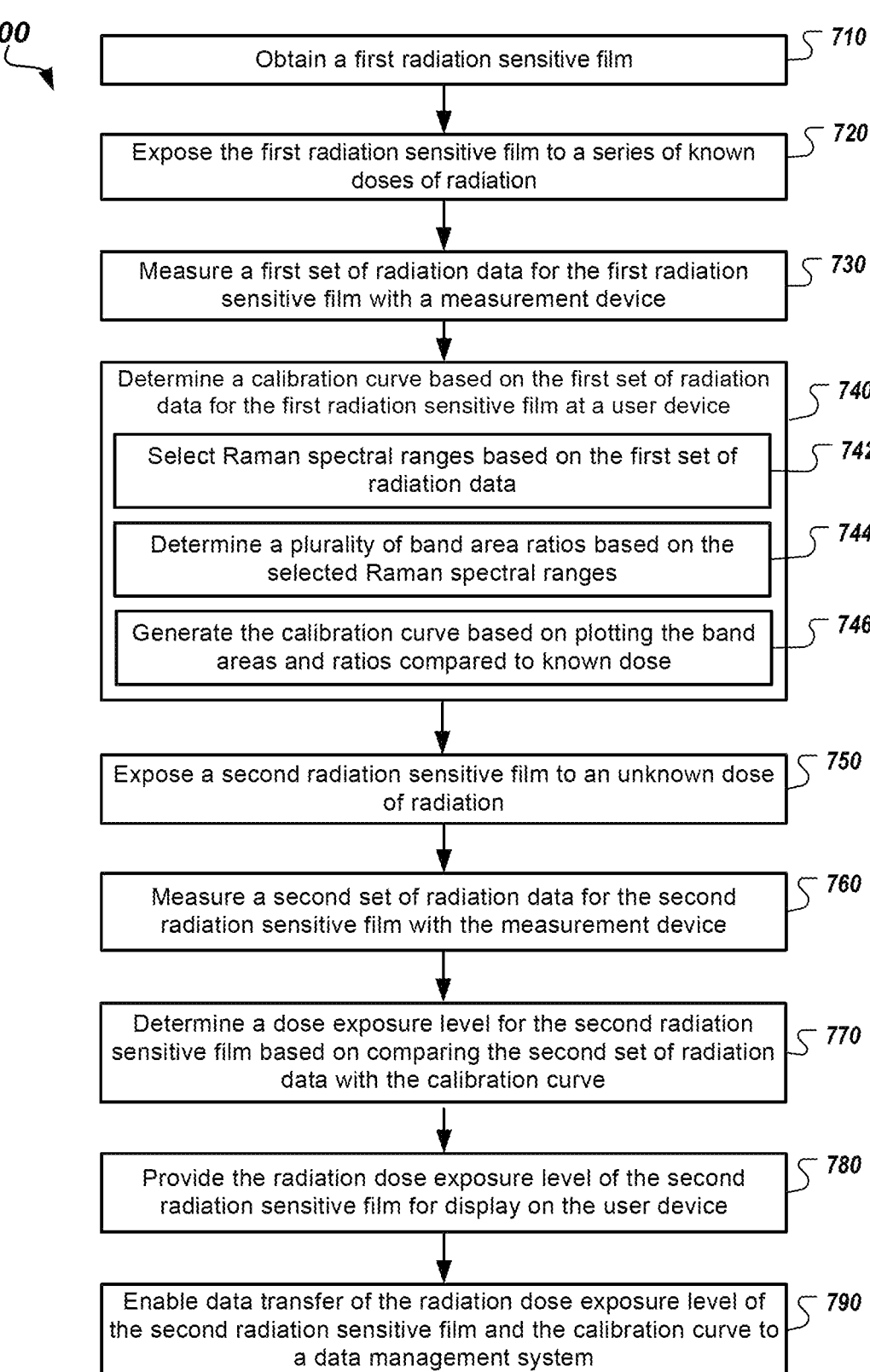

*700*

Obtain a first radiation sensitive film ⟋ *710*

Expose the first radiation sensitive film to a series of known doses of radiation ⟋ *720*

Measure a first set of radiation data for the first radiation sensitive film with a measurement device ⟋ *730*

Determine a calibration curve based on the first set of radiation data for the first radiation sensitive film at a user device ⟋ *740*

Select Raman spectral ranges based on the first set of radiation data ⟋ *742*

Determine a plurality of band area ratios based on the selected Raman spectral ranges ⟋ *744*

Generate the calibration curve based on plotting the band areas and ratios compared to known dose ⟋ *746*

Expose a second radiation sensitive film to an unknown dose of radiation ⟋ *750*

Measure a second set of radiation data for the second radiation sensitive film with the measurement device ⟋ *760*

Determine a dose exposure level for the second radiation sensitive film based on comparing the second set of radiation data with the calibration curve ⟋ *770*

Provide the radiation dose exposure level of the second radiation sensitive film for display on the user device ⟋ *780*

Enable data transfer of the radiation dose exposure level of the second radiation sensitive film and the calibration curve to a data management system ⟋ *790*

FIG. 7

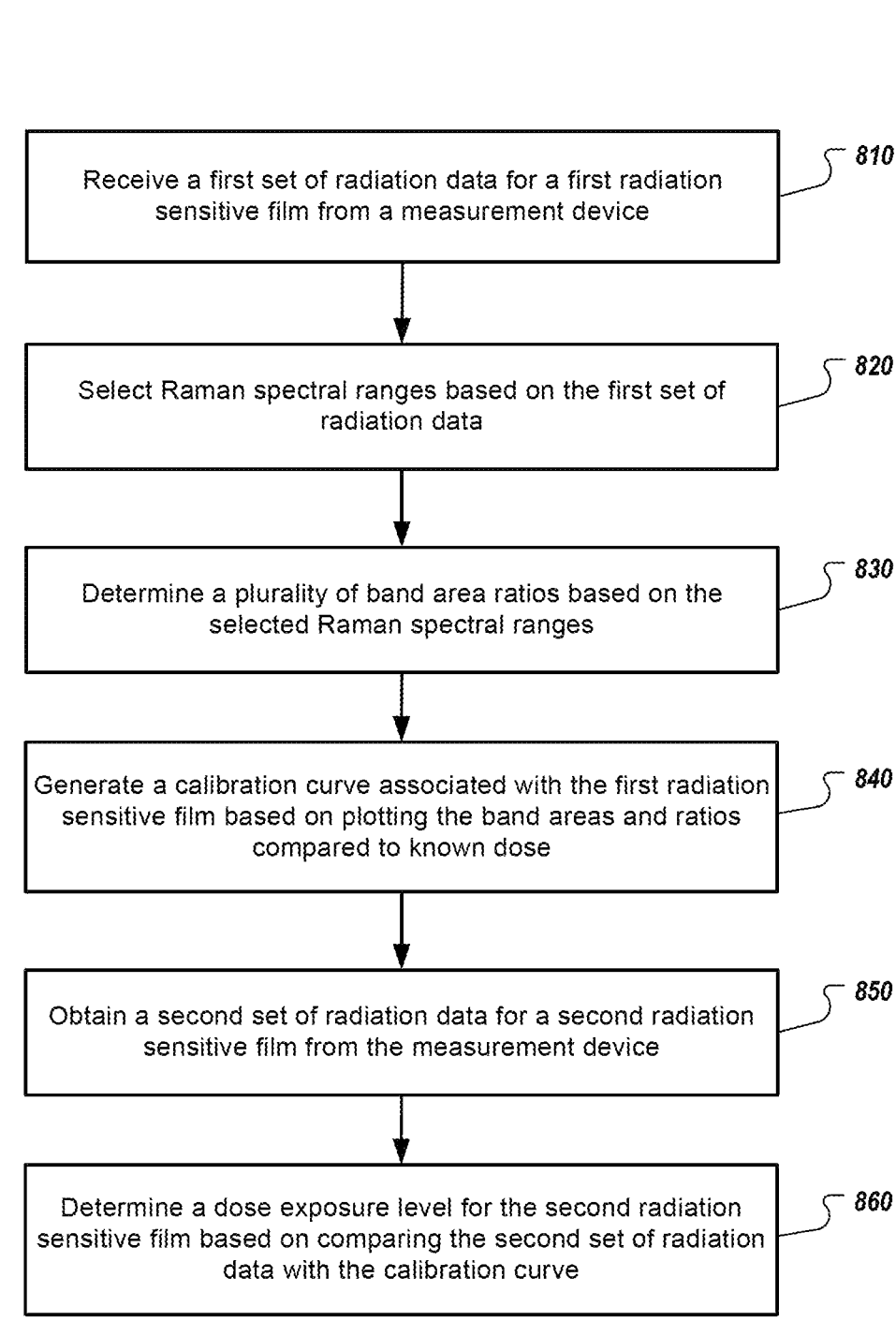

800

Receive a first set of radiation data for a first radiation
sensitive film from a measurement device     810

Select Raman spectral ranges based on the first set of
radiation data     820

Determine a plurality of band area ratios based on the
selected Raman spectral ranges     830

Generate a calibration curve associated with the first radiation
sensitive film based on plotting the band areas and ratios
compared to known dose     840

Obtain a second set of radiation data for a second radiation
sensitive film from the measurement device     850

Determine a dose exposure level for the second radiation
sensitive film based on comparing the second set of radiation
data with the calibration curve     860

FIG. 8

RADIATION DOSIMETRY METHOD

CROSS-REFERENCE TO RELATED APPLICATIONS

This application claims the benefit of U.S. Provisional Application Ser. No. 63/129,816 filed Dec. 23, 2020, which is incorporated herein in its entirety.

TECHNICAL FIELD

The present invention generally relates to a radiation dosimetry method and associated devices for carrying out the method. More particularly, this invention relates to such a method and associated apparatus which compensates for variations in amounts of a radiation-sensitive material in a radiation dosimetry film.

BACKGROUND

In facilities where radiation emitting sources are used, for example, in hospitals where cancer patients receive radiation treatments or in blood banks where blood products are irradiated, various methods are used to quantitatively determine the radiation dose delivered by the source. The methods practiced include the use of thermoluminescent dosimeters (TLD's), ionization-type radiation detectors, photographic film, and radiochromic materials. TLD's are inconvenient because they require a complicated and time-consuming read-out process. Ionization-type radiation detectors are awkward and unwieldy and require a complicated setup. Photographic film requires a time-consuming chemical processing procedure before read-out. Radiochromic materials are preferred because they do not require any post-exposure processing and they are capable of measuring radiation doses with a high spatial resolution, but they are inconvenient in current practice because the calculation of the dose requires a complex sequence of steps, subject to error.

The radiation-sensitive material of a radiation dosimeter may be comprised of micro-crystalline pentacosadiynoic acid (PCDA), or other diacetylenic compounds and other compounds that exhibit dose responsive chemical changes, dispersed in a polymer matrix. Subjecting monomeric PCDA crystals, or related compounds such as the metal salts of PCDA, to ionizing radiation results in progressive polymerization, the degree of polymerization increasing with radiation dose. The amount of polymerization (and hence, the radiation dose) can be determined by measuring either the optical density or the spectral absorption of the exposed dosimeter. However, it has been found that these parameters also vary with both the temperature of the device when measured as well as the thickness of PCDA dispersion and the moisture content of the polymer matrix. Maximum accuracy of dose measurement must account for the temperature and thickness and moisture effects.

Current film analysis technology centers around color change. A film badge dosimeter usually is loaded with one or more film packets. The simplest type of film badge consists of a small paper envelope containing a dental film, one-half of which is surrounded by a thin lead foil. The badge must contain one or more filters so that a comparison can be made of the relative blackening of the developed film from behind the various filters. This comparison reveals the extent of exposure to various types of radiation. Inherent in the use of such badge is the need of a developing process to develop the exposed film. A thermoluminescent dosimeter is one that functions on the principle of thermoluminescence; that is, the property of certain substances that release light upon heating after they have been exposed to ionizing radiation. Inherent in this type of dosimeter is the need for measuring either the peak intensity or the integrated quantity of light emitted. While such dosimeters perform satisfactorily, they require outside equipment or processes in order to function and/or be readable. That is, one cannot detect the level of absorbed radiation merely by visually observing the exposed material.

The Raman spectroscopic analysis technique is a non-contact spectroscopic analysis technique that uses a laser beam to perform non-destructive, real-time measurements of the composition of chemical mixtures without the use of an external contrast agent based on the Raman scattering effect. Raman spectroscopy is a vibrational spectrum of molecules (e.g., inelastic scattering of laser light due to vibrations of molecular bonds) that reflects the fingerprint characteristics of the molecule and can be used for the detection of substances. Raman spectroscopy detects and identifies a substance by detecting a Raman spectrum generated by the Raman scattering effect of the substance to be detected on excitation light. The Raman spectrum detection method is widely applied to the fields of liquid security inspection, jewelry detection, explosive detection, drug detection, medicine detection and the like.

In the field actual Raman spectroscopy, the calibration of the Raman spectroscopy detection device is an integral part of the whole Raman spectroscopy analysis process. Before the device is used, the device must be calibrated. The spectrum abscissa used by the spectrum detection device during measurement can be obtained after equipment calibration, a Raman spectrogram is synthesized with the measured spectrum signal according to the spectrum abscissa, and then the Raman spectrogram is compared with a spectrogram library through a pattern recognition algorithm to perform qualitative and quantitative analysis on the components of a measured sample. Calibration of a Raman spectroscopy detection device is typically accomplished by detection of a known sample with the Raman spectroscopy detection device.

Raman spectroscopic devices are now smaller and portable. However, there exists a need for an efficient calibration process for Raman spectroscopic devices that can be interfaced with portable user devices (e.g., smartphones equipped with a Raman spectrometer, portable Raman spectrometers, etc.). The combination of small size, ease-of-use, and chemical specificity renders Raman-based radiation-sensitive dosimeters excellent tools and an important advance in the art of radiation dosimetry with significant advantages for the healthcare industry.

SUMMARY

In embodiments of the invention, a method for implementing a radiation dosimetry process. The method includes obtaining a first radiation-sensitive film, exposing the first radiation-sensitive film to a series of known doses of radiation, measuring a first set of radiation data for the first radiation-sensitive film with a measurement device, and determining a calibration curve based on the first set of radiation data for the first radiation-sensitive film at a user device by (a) selecting Raman spectral ranges based on the first set of radiation data, (b) determining a plurality of band area ratios based on the selected Raman spectral ranges, and (c) generating the calibration curve based on plotting the band areas and ratios compared to known dose.

These and other embodiments can each optionally include one or more of the following features.

In some embodiments of the invention, the method further includes exposing a second radiation-sensitive film to an unknown dose of radiation, measuring a second set of radiation data for the second radiation-sensitive film with the measurement device, and determining a dose exposure level for the second radiation-sensitive film by comparing the second set of radiation data with the calibration curve.

In some embodiments of the invention, the method further includes transferring, by the user device, the calibration curve and the second set of radiation data for the second radiation-sensitive film to a data management system. In some embodiments of the invention, the method further includes providing the radiation dose exposure level of the second radiation-sensitive film for display on the user device.

In some embodiments of the invention, the selected Raman spectral ranges include data that does not fluctuate with radiation exposure and functions as an internal standard. In some embodiments of the invention, a correction factor is applied to the device calibration to compensate for energy dependence.

In some embodiments of the invention, the method further includes obtaining a third radiation-sensitive film, measuring a before-exposure data point for the third radiation-sensitive film with the measurement device, exposing the third radiation-sensitive film to one known dose of radiation, measuring an after-exposure data point for the third radiation-sensitive film with the measurement device, and adjusting the calibration curve based on the before-exposure data point and the after-exposure data point for the third radiation-sensitive film.

In some embodiments of the invention, the measurement device is a Raman spectroscopic device. In some embodiments of the invention, the Raman spectroscopic device is portable. In some embodiments of the invention, the Raman spectroscopic device capable of continuous or semi-continuous in-situ monitoring of the radiation-sensitive film.

In some embodiments of the invention, the measurement device measures the first set of radiation data for the first radiation-sensitive film based on at least one of a one-dimensional resonance Raman (1DRR) spectroscopy scan, a two-dimensional resonance Raman (2DRR) spectroscopy scan, and/or a three-dimensional resonance Raman (3DRR) spectroscopy scan.

In some embodiments of the invention, the first and the second radiation-sensitive film comprises a radiation-sensitive compound capable of detecting a radiation dose sensitive to Raman spectroscopy. In some embodiments of the invention, the radiation-sensitive compound is a diacetylene compound. In some embodiments of the invention, the diacetylene compound is a metal or metaloid-based diacetylene compound. In some embodiments of the invention, the diacetylene compound is a lithium-based diacetylene compound.

In some embodiments of the invention, the measurement device is capable of measuring dose response characteristics that are less than 1000 Gy. In some embodiments of the invention, the measurement device is capable of measuring dose response characteristics that are less than 400 kGy.

In some embodiments of the invention, the series of known doses of radiation and the unknown dose of radiation are based on X-rays. In some embodiments of the invention, the series of known doses of radiation and the unknown dose of radiation are based on Gamma rays. In some embodiments of the invention, the series of known doses of radiation and the unknown dose of radiation are based on ultraviolet light rays, visible light, electron beam, or combinations thereof.

In some embodiments of the invention, the first and/or the second radiation-sensitive film comprises an assembly that includes a lot number, a bar code, and an optionally applied adhesive suitable for Raman dosimetry measurements.

In embodiments of the invention, a system for implementing a radiation dosimetry process. The system includes a box of radiation-sensitive film comprising at least a first and a second radiation-sensitive film, and a measurement device. The measurement device is capable of measuring a first set of radiation data for the first radiation-sensitive film based on known doses of radiation, measuring a second set of radiation data for the second radiation-sensitive film based on an unknown dose of radiation, and providing radiation data to a user device having a processor. The user device is configured to (a) select Raman spectral ranges based on the first set of radiation data, (b) determine a plurality of band area ratios based on the selected Raman spectral ranges, (c) generate a calibration curve associated with the first radiation-sensitive film based on plotting the band areas and ratios compared to the known doses of radiation, and (d) determine a dose exposure level for the second radiation-sensitive film by comparing the second set of radiation data with the calibration curve.

In embodiments of the invention, a method for implementing a radiation dosimetry process. The method includes, at a device having a processor, receiving a first set of radiation data for a first radiation-sensitive film from a measurement device, wherein the first radiation-sensitive film was exposed to a series of known doses of radiation, selecting Raman spectral ranges based on the first set of radiation data, determining a plurality of band area ratios based on the selected Raman spectral ranges, generating a calibration curve associated with the first radiation-sensitive film based on plotting the band areas and ratios compared to known dose, obtaining a second set of radiation data for a second radiation-sensitive film from the measurement device, wherein the second radiation-sensitive film was exposed to an unknown dose of radiation, and determining a dose exposure level for the second radiation-sensitive film based on comparing the second set of radiation data with the calibration curve.

In accordance with some implementations, a device includes one or more processors, a non-transitory memory, and one or more programs, the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

The above summary may present a simplified overview of some embodiments of the invention in order to provide a basic understanding of certain aspects of the embodiments of the invention discussed herein. The summary is not intended to provide an extensive overview of the embodiments of the invention, nor is it intended to identify any key or critical elements, or delineate the scope of the embodiments of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification and in which like reference numerals refer to like features, illustrate various embodiments of the invention and, together with the general description given above and the detailed description given below, serve to explain the embodiments of the invention.

FIG. 5 is a flowchart of an example process for determining radiation dose based on a generated calibration curve at a user device, according to embodiments of the invention.

FIG. 7 is a flowchart of an example process for determining a calibration curve based on Raman spectroscopy and determining radiation dose exposure level for an unknown dose based on the calibration curve, according to embodiments of the invention.

FIG. 8 is a flowchart of an example process for determining a calibration curve based on Raman spectroscopy and determining radiation dose exposure level for an unknown dose based on the calibration curve at a user device, according to embodiments of the invention.

DETAILED DESCRIPTION

Figure 1:
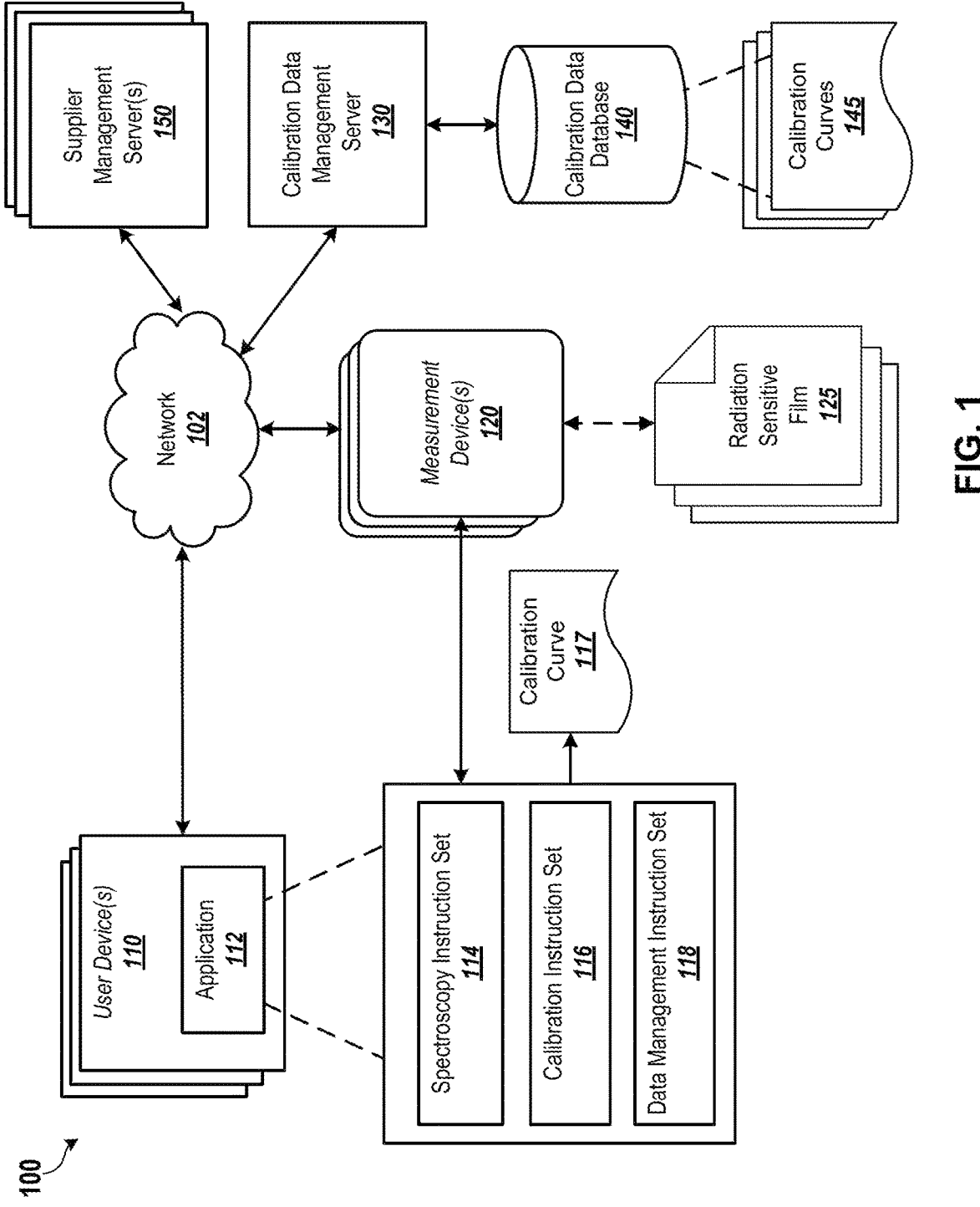
FIG. 1 illustrates an environment for implementing a radiation dosimetry calibration process, according to embodiments of the invention.

The technology in this patent application is related to systems and methods for implementing a radiation dosimetry process. The radiation dosimetry process may be implemented by an integrated product of a portable Raman spectroscopic device and a radiation-sensitive dosimeter and interfacing the product with a display device to simplify the dosimetry process. The potential for spectral data capture, wireless data interfacing, simplifying determination of proper blood treatment (beyond the visual indicator), sharing the results of the sample directly to hospital/treatment center IT systems, as well as application extensions provide advantages well beyond conventional blood processing.

Thus, in accordance with the present disclosure, there is provided an integrated product of a portable Raman spectroscopic device and a radiation-sensitive dosimeter. The product can be interfaced with a display device which can be a portable display device. The combination of small size, ease-of-use, and chemical specificity renders Raman-based radiation-sensitive dosimeters excellent tools and an important advance in the art of radiation dosimetry with significant advantages for the healthcare industry. One objective of the present disclosure relates to a mobile application of the integrated product of a portable Raman spectroscopic device and a radiation-sensitive dosimeter, including: a) capturing data corresponding to the radiation sensitivity of the dosimeter associated with a sample by user interface (UI) software, b) processing the data through the user interface software, c) measuring the radiation intensity through the processed data, and/or d) analyzing the data corresponding to the radiation-sensitivity.

More specifically, this technology includes a radiation dosimetry calibration process that obtains a radiation-sensitive film (e.g., radiochromic film, or radiation-sensitive film), exposes the radiation-sensitive film to a series of known doses of radiation, measures radiation data (e.g., Raman spectroscopy data) for the radiation-sensitive film with a measurement device (e.g., a Raman spectrometer, or a portable Raman spectroscopic device), and determines a calibration curve based on radiation data for the radiation-sensitive film at a user device (e.g., at a mobile device). The steps for generating a calibration curve may include (i) selecting Raman spectral ranges based on the radiation data, (ii) determining a plurality of band area ratios based on the selected Raman spectral ranges, and (iii) generating the calibration curve based on plotting the band areas and ratios compared to known dose. Alternatively, in some embodiments, a Raman spectral range may be selected that is unresponsive to radiation exposure for use as an internal standard for generating a calibration curve.

The radiation dosimetry process may further include determining a dose exposure level for another radiation-sensitive film (e.g., a second film in the box/lot of film from which the calibration curve was generated). Determining a dose exposure level may include exposing a second radiation-sensitive film to an unknown dose of radiation, measuring a second set of radiation data for the second radiation-sensitive film with the measurement device, and determining a dose exposure level for the second radiation-sensitive film by comparing the second set of radiation data with the calibration curve. Thus, the measurement of the second film may proceed in a similar fashion to the measurement of the calibration curve, at a single point. For example, the Raman spectrometer results are then compared to the calibration curve (e.g., via at an application running on a user's mobile device), enabling the determination of the dose exposure.

In some implementations, the radiation dosimetry calibration process described herein for generating a calibration curve could be utilized to create a universal calibration curve. For example, one common practice in the radiation dosimetry industry is to calibrate each lot of film. However, a generated calibration curve using the processes described herein could be used as a "universal" calibration that could be employed for every lot of film for the same type of film.

In some implementations, the dosimetry device may be used in the sterilization of surfaces and solutions, medical imaging, medical or industrial equipment quality assurance testing, UV light measurement, food processing and storage, transportation of radiation sensitive materials, phytosanitary applications, insect sterilization processes, industrial curing processes, pathogen reduction processes, blood processing, or other applications where the knowledge of radiation exposure dose is important. In another embodiment, the dosimetry device of the present application finds various uses in blood bags, their method of processing and use. Blood products are typically irradiated using photons to diminish the risk of transfusion-associated graft vs. host disease (TA-GVHD). The desired effect of irradiating the blood is to inhibit lymphocyte function and therefore to prevent GVHD while not causing damage to platelets and other blood fractions.

Accordingly, the dosimetry device of the present application allows a user to process a blood product, take spectroscopic data from the indicator window after blood processing, and subsequently the software application will then process the spectroscopic data and determine the dosage applied to the blood product.

FIG. 1 is an example environment 100 for implementing a radiation dosimetry process, according to embodiments of the invention. The example environment 100 includes one or more user device(s) 110, one or more measurement device(s) 120, a calibration data management server 130, and one or more supplier management server(s) 120, that communicates over a data communication network 102, e.g., a local area network (LAN), a wide area network (WAN), the Internet, a mobile network, or a combination thereof.

The one or more user device(s) 110 (e.g., a device used by a radiation dosimetry calibration user) can include a desktop, a laptop, a server, or a mobile device, such as a smartphone, tablet computer, and/or other types of mobile devices. The one or more user device(s) 110 includes applications, such as the application 112, for managing calibration techniques described herein to/from the measurement device(s) 120 (e.g., a Raman spectrometer device) and/or the calibration data management server 130. The one or more user device(s) 110 can include other applications. The one or more user device(s) 110 can initiate a calibration process request by a user via application 112. The one or more user device(s) 110 may be utilized by a user (e.g., a clinician) to review calibration results.

The application 112 may include one or more sets of instructions or modules for an example radiation dosimetry calibration process as described herein, such as the spectroscopy instruction set 114, the calibration instruction set 116, and/or the data management instruction set 118. The spectroscopy instruction set 114 may include instructions for integrating and/or communicating with a measurement device 120. For example, the measurement device 120 may be a portable spectrometer device, and the spectroscopy instruction set 114 may be utilized to allow a user at user device 110 to control one or more features of the measurement device 120. The user device 110 may communicate with the one or more measurement device(s) 120 via the network 102 (e.g., WiFi, etc.). Additionally, or alternatively, the user device 110 may communicate with the one or more measurement device(s) 120 via a direct connection such as a wired connection or wireless connection (e.g., Bluetooth, WiFi direct, etc.) without having use the network 102.

The calibration instruction set 116 may include instructions for implementing the radiation dosimetry calibration process as described herein. For example, for a Raman spectroscopy calibration, the calibration instruction set 116 may be configured to determine a calibration curve 117 based on obtained radiation data from a measurement device 120 for a first radiation-sensitive film 125 of a set of films at the user device 110 by selecting Raman spectral ranges based on the first set of radiation data, determining a plurality of band area ratios based on the selected Raman spectral ranges, and generating the calibration curve 117 based on plotting the band areas and ratios compared to a known dose. Additionally, the calibration instruction set 116 may be configured to determine a dose exposure level for a second radiation-sensitive film by comparing a second set of radiation data corresponding to the film with the unknown dosage with the calibration curve (e.g., the Raman spectrometer results are then compared to the calibration curve, enabling the determination of the dose exposure for the second radiation-sensitive film 125).

Alternatively, a calibration curve for a particular set of films may be obtained from a supplier (e.g., supplier management server 150 via the calibration data management server 130). Thus, the calibration instruction set 116 may be configured to determine a dose exposure level for a second radiation-sensitive film by comparing a second set of radiation data corresponding to the film with the unknown dosage with a calibration curve that is obtained from the supplier.

The data management instruction set 118 may include instructions for communicating calibration results with the calibration data management server 130 as part of the dosimetry calibration process as described herein. For example, for a Raman spectroscopy calibration process, the data management instruction set 118 may be configured to send calibration curve(s) 117 and/or receive calibration curves 145 from the calibration curves database 145 via the calibration management server 130 via network 102.

The one or more measurement device(s) 120 may include a radiation measurement device that is capable of measuring radiation exposure. In the exemplary embodiment, the one or more measurement device(s) 120 are Raman spectrometers, such as a portable Raman spectroscopic device. In some embodiments, a measurement device 120 is a Raman spectroscopic device capable of continuous or semi-continuous in-situ monitoring of the radiation-sensitive film.

In some embodiments, the one or more measurement device(s) 120 are capable of measuring dose response characteristics that include a wide range of doses (e.g., less than 1,000 gray (Gy)). For example, some example dose ranges for the one or more measurement device(s) 120 may include: 0.2-10 Gy, 0.4-40 Gy, 1-100 Gy, 10-1,000 Gy, and the like. The example dose ranges may be applied for different radiation exposure applications, such as patient dosimetry for an intensity-modulated radiation therapy (IMRT) plan verification, patient dosimetry for stereotactic radiosurgery (SRS) and stereotactic radiotherapy (SRT), routine machine quality assurance such as radiation field/light field testing, and/or other applications measuring medium to high dose based on particular patient dosimetry needs. In some embodiments, the one or more measurement device(s) 120 are capable of measuring dose response characteristics that include a larger amount of radiation (e.g., up to 400 kGy).

In some embodiments, the one or more measurement device(s) 120 measure radiation data for the radiation-sensitive film 125 from doses of radiation applied to the radiation-sensitive film that are derived from X-rays. Alternatively, the one or more measurement device(s) 120 measure radiation data for the radiation-sensitive film 125 from doses of radiation that are derived from Gamma rays, ultraviolet light rays, visible light, electron beam, or other sources of ionizing radiation and combinations thereof.

In some embodiments, the one or more measurement device(s) 120 measure radiation data for the radiation-sensitive film 125 based on resonance Raman spectroscopy. For example, resonance Raman refers to Raman spectra acquired using a laser light probe operating within an ultraviolet or visible absorbance band of the molecule of interest, where Raman lasers are available at a number of different wavelengths. Resonance Raman spectroscopy exhibits enhancements in Raman intensity and sensitivity. Depending upon the laser ultimately selected for use in the method, the laser operating wavelength may or may not be within a known absorption band. In some implementations, the one or more measurement device(s) 120 measure radiation data for the radiation-sensitive film 125 based on a one-dimensional resonance Raman (1DRR) spectroscopy scan, a two-dimensional resonance Raman (2DRR) spectroscopy scan, a three-dimensional resonance Raman (3DRR) spectroscopy scan, or a combination thereof. Alternatively, in some embodiments, non-resonance Raman spectroscopy may be used by the techniques described herein. For example, non-resonance Raman spectroscopy can be used in an embodiment in which a diacetylenic compound other than PCDA or any other compound having a dose-sensitive chemical change does not possess a ultraviolet or visible absorption band accessible by the laser in use.

In some embodiments, the one or more measurement device(s) 120 measures the radiation sensitivity on wavelength selection using non-linear calibration, such as support vector regression. The wavelength selection protocol may be based on the minimization of cross-validation error in the relevant data. This outperforms wavelength selection in typical linear methods such as partial least squares and principal component regression. The present method computes the spectral window(s) or regions of the Raman spectrum where the effects of potential interference with respect to the analyte of interest are minimized. This method also optimizes the selection of spectral bands as opposed to selecting individual (and often isolated) spectral points (pixels). Any vibrational and rotational spectra give Voigt profiles that typically have a full width at half maximum (FWHM) of at least 4-8 cm$^{-1}$. The existence of such intrinsic spectral intervals leads to the selection of minimum spectral band size. The application of the preferred method leads to a significant reduction in number of wavelengths that need to be sampled (upward of three-fold as compared to full spectrum analysis) for the development of an accurate calibration system.

This reduction can be partly attributed to the chemical specificity of Raman spectroscopy, which allows the detection of molecules by sampling a limited number of wavelengths. In addition, it has been found that the prediction accuracy and robustness are enhanced as a result of the wavelength selection procedure. This is because the larger changes exhibited at select Raman bands exhibit higher signal-to-noise ratios, improving accuracy. Use of broader spectral ranges results in inclusion of non-responsive bands, which may inhibit interpretation and reduce accuracy. From a practical point of view, wavelength selection may reduce measurement time, cost, and aid miniaturization of the device.

In some embodiments, the present application provides an accurate method of monitoring radiation dose using a new dosimetry device expressed as a predictable or reproducible response characteristic of the selected band area ratio per dose range using a Raman spectrometer. In some embodiments, the present application provides an accurate method of monitoring radiation dose using a new dosimetry device expressed as a linear response characteristic of the selected band area ratio per dose range using a Raman spectrometer.

In some embodiments, the radiation-sensitive film 125 includes a radiation-sensitive compound capable of detecting a radiation dose sensitive to Raman spectroscopy. For example, each respective piece of radiation-sensitive film 125 would include the same compound, i.e., from the same "lot" of film.

In some implementations, the compound in the radiation-sensitive film 125 is a compound that exhibits a radiation dose response that is suitable for characterization by Raman spectroscopic techniques. In some implementations, the compound in the radiation-sensitive film 125 is a diacetylene compound. In some implementations, the diacetylene compound is a metal or metaloid-based diacetylene compound. Alternatively, in some implementations, the diacetylene compound is a lithium-based diacetylene compound.

As used herein, radiation-sensitive film 125 may refer to a one piece or sheet of radiation-sensitive film, or radiation-sensitive film 125 may refer to a box/lot of radiation-sensitive film (e.g., a plurality of sheets of radiation-sensitive film). In some embodiments, the radiation-sensitive film 125 includes an assembly that includes a lot number, a bar code, and an optionally applied adhesive suitable for Raman dosimetry measurements.

In one embodiment, the radiation-sensitive film 125 may be a radiochromic film, i.e., a film that instantly changes color upon exposure to ionizing radiation and needs no chemical processing. These films have exceptional spatial resolution reaching to a level of at least 0.025 mm and, in general, it has been found that the adsorbed radiation dose for radiochromic films is an accurate reflection of the dose adsorbed by tissue.

Materials used in the sensing strip of a radiochromic film may include diacetylenes having the general formula (I):

$$R^1\text{—}C\equiv C\text{—}C\equiv R^{11}. \tag{I}$$

wherein $R^1$ and $R^{11}$ are substituent groups. They may form red or blue colored polymers with a general formula (II):

$$\left[ =(R^1)C\text{—}C\equiv C\text{—}C(R^{11}) \right]_n, \tag{II}$$

where n is the number of monomer units, when irradiated with high energy radiation such as X-ray, gamma ray, electrons, and neutrons. As exposure increases, the color of the sensing strip comprising diacetylenes intensifies proportional to the dose.

In some embodiments, a radiation-sensitive dosimeter assembly includes radiation-sensitive film 125 and a radiation dose indicator. Accordingly, the radiation dose indicator may include a radiation-sensitive composition which measures the radiation and indicates the change in radiation. The radiation-sensitive composition from the radiation-sensitive film 125 may be selected from radiation-sensitive films, radiation-sensitive patches, or any other devices including electronic devices which can detect radiation emitted from the radiation source.

In some embodiments, the calibration data management server 130 manages system wide calibration data between end user's and/or radiation-sensitive film suppliers. For example, calibration data management server 130 receives calibration curves 145 from user device(s) 110 and/or supplier management server(s) 150 and stores the calibration curves 145 at the calibration data database 140. The supplier management server(s) 150 are entities such as radiation-sensitive film manufacturers, and the like, that manufacture the radiation-sensitive film 125, and that can also generate calibration curves for each respective lot of radiation sensitive film 125. The supplier management server(s) 150 can then send the supplier determined calibration curves to the calibration data management server 130. Thus, the end user at user device 110 can then obtain (e.g., download) a calibration curve for a respective lot of radiation-sensitive film without having to generate the calibration curve themselves. The calibration management server 130 and/or the supplier management server(s) 150 may be a personal computing device, tablet computer, thin client terminal, smart phone and/or other such computing device capable of managing and protecting radiation and calibration data per government regulated protocols.

Figure 2:
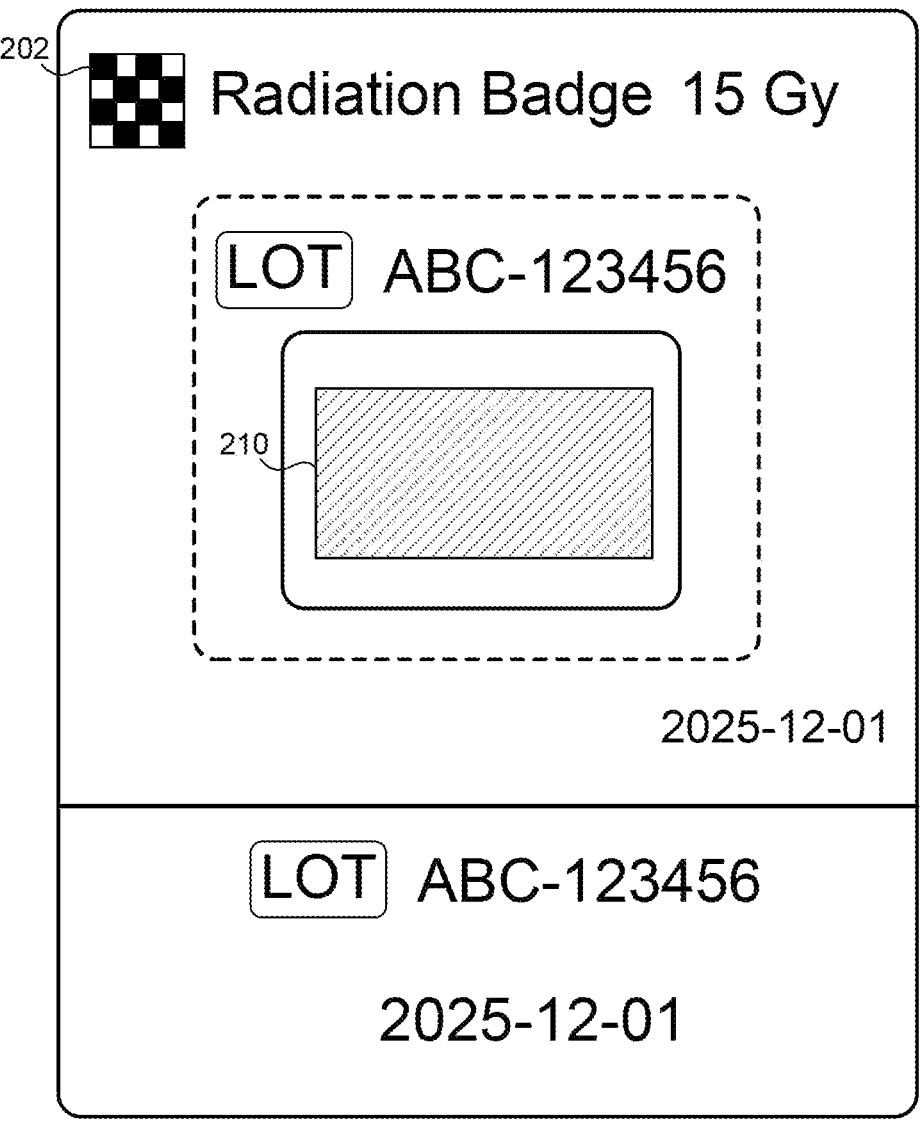
FIG. 2 illustrates an exemplary radiation dosimeter assembly, according to embodiments of the invention.

FIG. 2 illustrates an exemplary radiation dosimeter assembly 200, according to embodiments of the invention. The radiation dosimeter assembly 200 illustrates an example radiation badge that a user may where to determine an amount of radiation exposure that he or she has been exposed to (e.g., an X-ray technician). The radiation dosimeter assembly 200 includes radiation-sensitive film 210 and a bar code 202. Additionally, the radiation dosimeter assembly 200 includes a lot number (e.g., LOT: "ABC-123456"). For example, the radiation sensitive film 210 is from a lot of additional radiation-sensitive film, such that a calibration curve generated for radiation-sensitive film 210 could be utilized to determine a dose exposure level for a second radiation-sensitive film from the same lot (e.g., LOT: "ABC-123456") based on comparing a second set of radiation data associated with the second radiation-sensitive film with the calibration curve determined from the radiation-sensitive film 210.

In some embodiments, the radiation dosimeter assembly 200 includes an optionally applied adhesive suitable for Raman dosimetry measurements. For example, in order to permit radiation dosimeter assembly 200 to be attached to a substrate or other object being subjected to radiation, a pressure sensitive adhesive ply may be applied to the bottom or back side of the radiation dosimeter assembly 200. The adhesive ply maybe provided with a removable release sheet which is adapted to be removed from the adhesive ply when indicator radiation dosimeter assembly 200 is attached to the substrate (e.g., a user sticking the radiation badge on his or her article of clothing).

Figure 3:
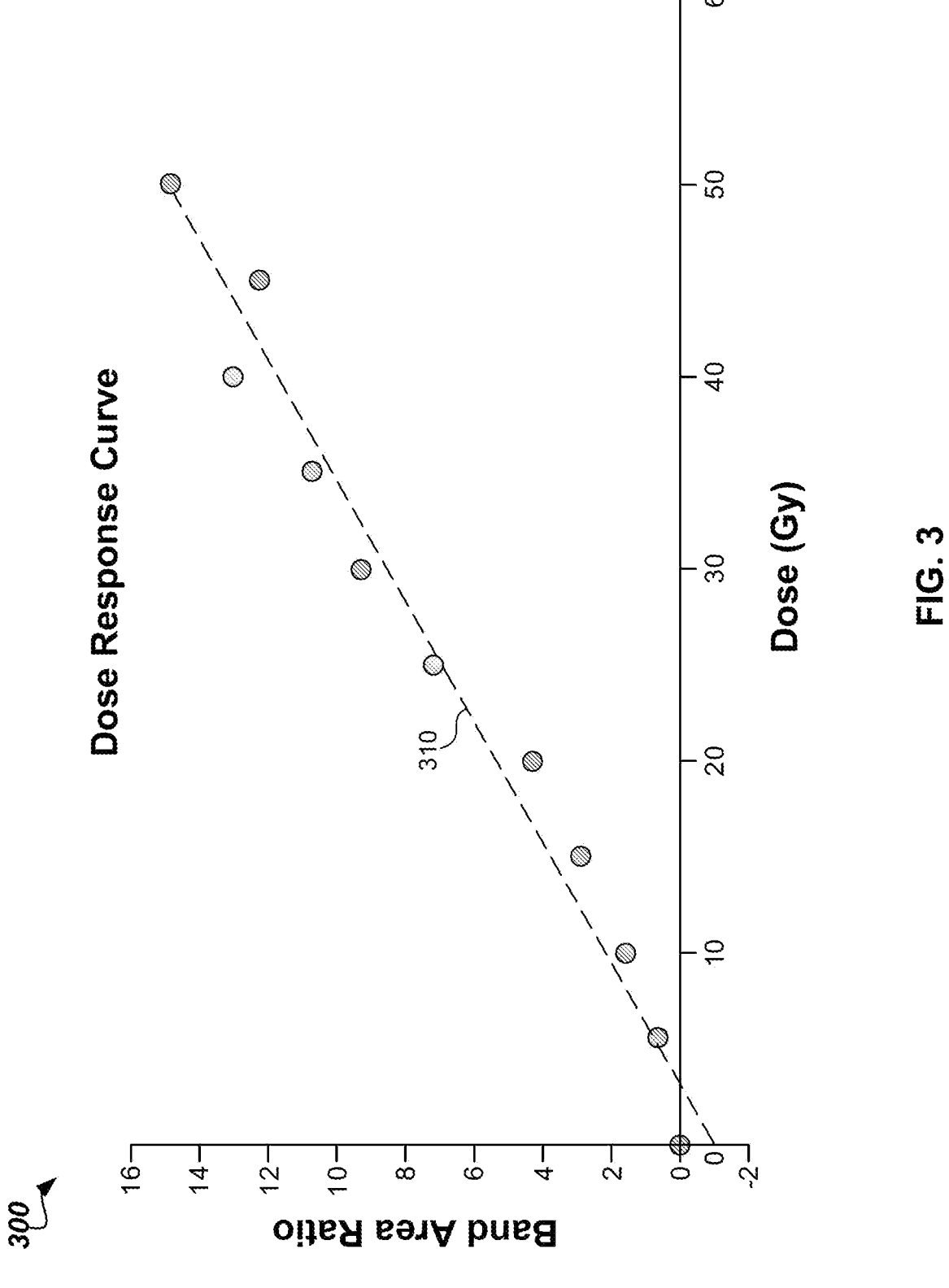
FIG. 3 illustrates a graph of an exemplary calibration curve based on radiation dose response, according to embodiments of the invention.

FIG. 3 illustrates a graph 300 of an exemplary calibration curve 310 based on radiation dose response, according to embodiments of the invention. For example, the calibration curve as illustrated in graph 300 may be determined based on a radiation dosimetry calibration process that obtains a radiation-sensitive film (e.g., radiochromic film, or radiation-sensitive film such as radiation-sensitive film 210), exposes the radiation-sensitive film to a series of known doses of radiation, measures radiation data (e.g., Raman spectroscopy data) for the radiation-sensitive film with a measurement device (e.g., a Raman spectrometer, or a portable Raman spectroscopic device), and determines a calibration curve 310 based on radiation data for the radiation-sensitive film at a user device (e.g., at a mobile device such as user device 110). The steps for generating a calibration curve, such as graph 300, may include (i) selecting Raman spectral ranges based on the radiation data, (ii) determining a plurality of band area ratios based on the selected Raman spectral ranges, and (iii) generating the calibration curve 310 based on plotting the band areas and ratios compared to known dose. For example, the measurement device provides the band area ratios for each known dose of radiation given (e.g., 0-50 Gy in 5 Gy increments).

In some embodiments, determining the calibration curve may utilize multivariate calibration and/or regression methods. For example, a calibration curve may be generated based on a Partial Least Squares Regression, a Principal Component Regression, and the like. Multivariate methods have the advantage of not requiring modelling of all components in a complex system simultaneously in order to produce good predictions. It is possible to predict the response even if other sources of variability (interferences) are present. Further, multivariate methods can implicitly model other sources of variation in the system not related to the response of interest, aiding accuracy of predictions.

Figure 4:
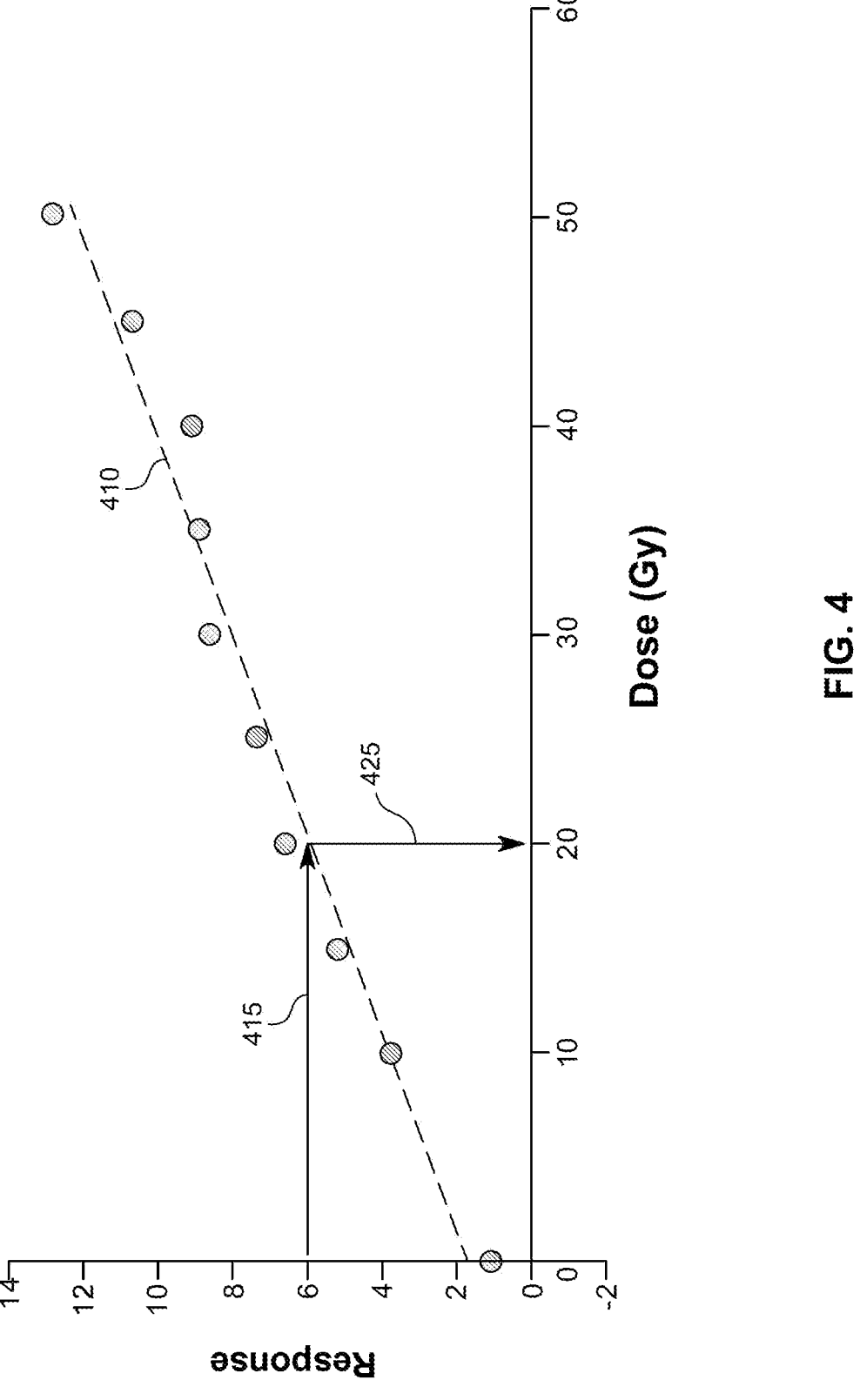
FIG. 4 illustrates an exemplary comparison graph for determining radiation dose based on a calibration curve, according to embodiments of the invention.

FIG. 4 illustrates an exemplary graph 400 for determining radiation dose, according to embodiments of the invention. For example, the calibration curve 410 as illustrated in graph 400 may be determined based on a radiation dosimetry calibration process as described herein. Determining a dose exposure level may include exposing a second radiation sensitive film to an unknown dose of radiation, measuring a second set of radiation data (e.g., radiation data line 415) for the second radiation-sensitive film with the measurement device, and determining a dose exposure level for the second radiation-sensitive film by comparing the second set of radiation data (415) with the calibration curve 410 to generate the dose value (e.g., radiation dose data line 425). For example, the Raman spectrometer results are then compared to the calibration curve (e.g., via at an application running on a user's mobile device), enabling the determination of the dose exposure for the unknown doses. As illustrated in the comparison graph 400 the Raman spectrometer results for the second radiation-sensitive film are compared to the calibration curve to enable the determination of the dose exposure as indicated by lines 415 and 425.

FIG. 5 illustrates a flowchart of an example process 500 for implementing a radiation dosimetry calibration process, according to embodiments of the invention. In particular, FIG. 5 is an example process 500 for a user-defined calibration approach (e.g., determining a calibration curve at a user device 110). Operations of the process 500 can be implemented, for example, by a system that includes one or more data processing apparatus, such as user device 110, measurement device 120, and calibration data management server 130 of FIG. 1.

A first radiation-sensitive film is appropriated at block 510. For example, a user (e.g., an X-ray technician) opens a new lot of radiation-sensitive film and chooses one radiation-sensitive film to use as the calibration film for the remaining film in the lot.

The first radiation-sensitive film is then exposed to a series of known doses of radiation at block 520. For example, known doses of high energy radiation such as X-ray, gamma ray, electrons, and neutrons, is delivered to the first radiation-sensitive film (e.g., the user selected film to be used for calibration).

A first set of radiation data of the first radiation-sensitive film is measured with a measurement device at block 530. For example, a user may use a radiation detection device, such as a Raman spectrometer device (e.g., measurement device 120 of FIG. 1) to measure the radiation data for the selected film.

A calibration curve is generated based on the first set of radiation data of the first radiation-sensitive film at a user device at block 540. For example, as illustrated in FIG. 3, calibration curve 310 may be generated by the calibration instruction set 116 at the user device 110 based on the obtained radiation data from the measurement device 120 for the selected film. For example, Raman spectral ranges are selected for analysis (e.g., 2066 cm-1 (polymerization) and 1720 cm-1 (internal standard) bands). The second step for determining a calibration curve may include determining a plurality of band area ratios based on the selected Raman spectral ranges at block 744. For example, as illustrated in FIG. 3, the measurement device provides the band area ratios for each known dose of radiation given (e.g., 0-50 Gy in 5 Gy increments). The third step for determining a calibration curve may include generating the calibration curve based on plotting the band areas and ratios compared to known dose at block 746 (e.g., calibration curve 310 of FIG. 3). In some implementations, the spectral regions for a particular chemical compound should be the same, regardless of radiation type (e.g., Gamma, X-ray, visible light, etc.) However, for a different diacetylene or other appropriate radiation-sensitive compound, there may be some shift in the spectral bands that can be accounted for in the processes described herein.

A second radiation-sensitive film is exposed to an unknown dose of radiation at block 550. The second radiation-sensitive film is selected from the same lot/box as the first radiation-sensitive film that the calibration curve was generated for. For example, unknown doses of radiation such as X-ray, gamma ray, electrons, and neutrons, are delivered to the second radiation-sensitive film.

A second set of radiation data of the second radiation-sensitive film is determined based on the calibration curve at block 560. For example, the second set of radiation data of the second radiation-sensitive film is measured with measurement device 120, and a dose exposure level for the second radiation-sensitive film is determined based on comparing the second set of radiation data with the calibration curve, as illustrated and discussed herein with Reference to FIG. 4.

The second set of radiation data of the second radiation-sensitive film is provided for display on the user device at block 570. For example, the user device 110 displays the determined radiation results after applying the calibration curve the measurement results.

Data transfer of the second set of radiation data of the second radiation-sensitive film and the calibration curve to a data management system is enabled at block 580. For example, the user device 110 can transfer the calibration curve data and/or the second set of radiation data of the second radiation-sensitive film to the calibration data management server 130. The calibration data management server 130 can then store the calibration curve(s) in the calibration data database 140.

Figure 6:
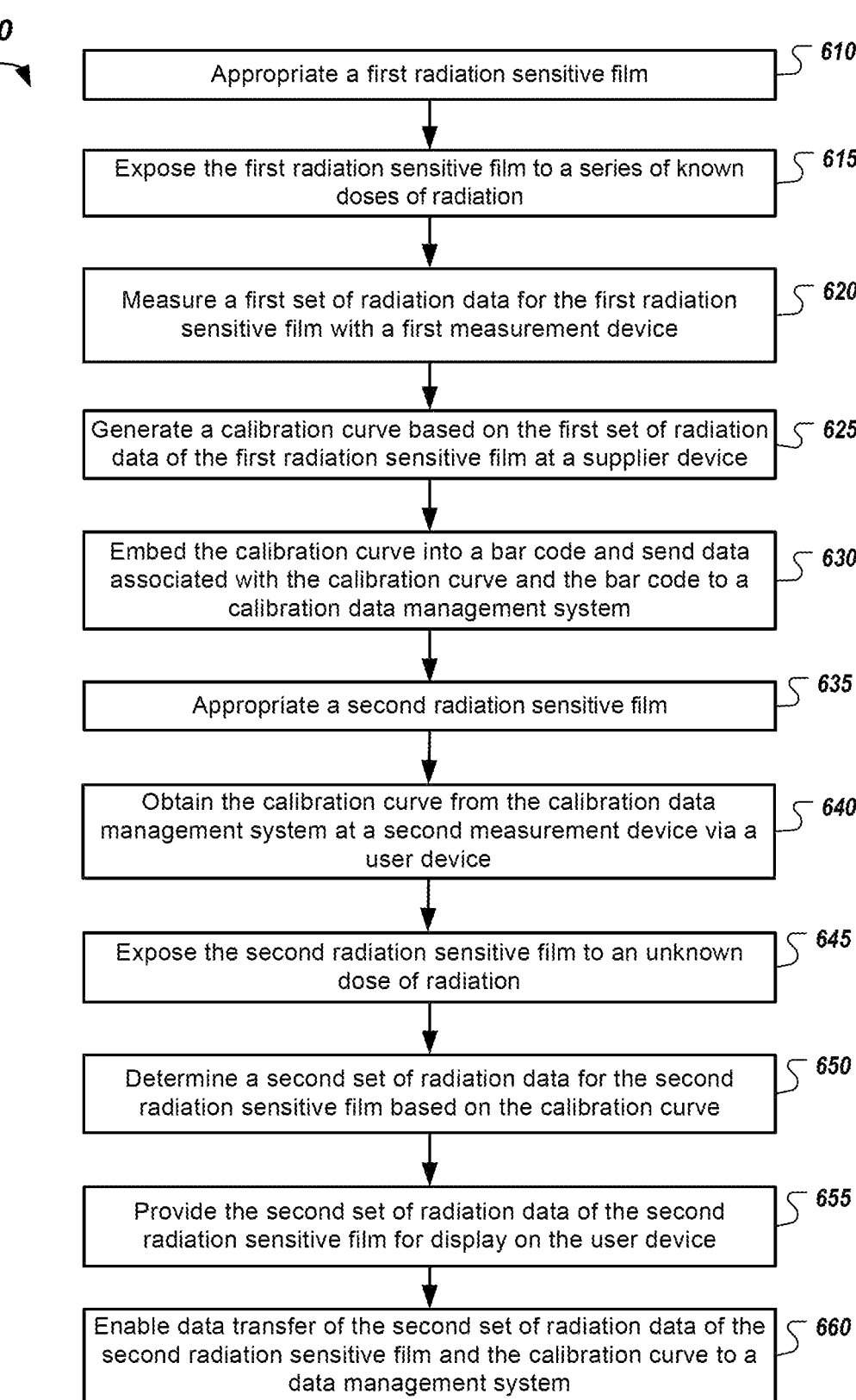
FIG. 6 is a flowchart of an example process for determining radiation dose based on an obtained calibration curve from a supplier at a user device, according to embodiments of the invention.

FIG. 6 is a flowchart of an example process 600 for determining radiation dose based on an obtained calibration curve from a supplier at a user device, according to embodiments of the invention. In particular, FIG. 6 is an example process 600 for a supplier defined calibration approach (e.g., determining a calibration curve at a supplier management server 150). Operations of the process 600 can be implemented, for example, by a system that includes one or more data processing apparatus, such as user device 110, measurement device 120, and calibration data management server 130 of FIG. 1.

A first radiation-sensitive film is appropriated at block 610. For example, a user (e.g., an operator at a supplier of the radiation-sensitive film) opens a new lot of radiation-sensitive film and chooses one radiation-sensitive film to use as the calibration film for the remaining film in the lot.

The first radiation-sensitive film is then exposed to a series of known doses of radiation at block 615. For example, known doses of high energy radiation such as X-ray, gamma ray, electrons, and neutrons, is delivered to the first radiation-sensitive film at the supplier's location (e.g., the user-selected film to be used for calibration).

A first set of radiation data of the first radiation-sensitive film is measured with a measurement device at block 620. For example, a user may use a radiation detection device, such as a Raman spectrometer device (e.g., measurement device 120 of FIG. 1) to measure the radiation data for the selected film.

A calibration curve is generated based on the first set of radiation data of the first radiation-sensitive film at a supplier device at block 625. For example, as illustrated in FIG. 3, calibration curve 310 may be generated by a calibration instruction set at one of the one or more supplier management server(s) 150 based on the received radiation data from the measurement device 120 for the selected film via network 102. For example, Raman spectral ranges are selected for analysis (e.g., 2066 cm-1 (polymerization) and 1720 cm-1 (internal standard) bands). The second step for determining a calibration curve may include determining a plurality of band area ratios based on the selected Raman spectral ranges at block 744. For example, as illustrated in FIG. 3, the measurement device provides the band area ratios for each known dose of radiation given (e.g., 0-50 Gy in 5 Gy increments). The third step for determining a calibration curve may include generating the calibration curve based on plotting the band areas and ratios compared to known dose at block 746 (e.g., calibration curve 310 of FIG. 3). In some implementations, the spectral regions for a particular chemical compound should be the same, regardless of radiation type (e.g., Gamma, X-ray, visible light, etc.) However, for a different diacetylene or other appropriate radiation-sensitive compound, there may be some shift in the spectral bands that can be accounted for in the processes described herein.

The calibration curve is embedded into a bar code and data associated with the calibration curve and the bar code is sent to a calibration data management system at block 630. For example, a supplier associated with the supplier management server 150 associated the generated calibration curve that is specific to a particular lot of radiation-sensitive film (e.g., LOT: "ABC-123456" of FIG. 2) and embeds a link to that data in a bar code (e.g., bar code 202) that the end user can scan. For example, an X-ray technician using user device 110, can scan the bar code 202 and be able to access the calibration curve associated with that lot in order to determine dose exposures for unknown doses for each radiation-sensitive film associated with that calibration curve (e.g., the same lot).

A second radiation-sensitive film is appropriated at block 635. For example, an end user (e.g., an X-ray technician) at a client site opens a box/lot of radiation-sensitive film (e.g., LOT: "ABC-123456") from the supplier.

A calibration curve is obtained from the calibration data management system at a second measurement device via a user device at block 640. For example, the calibration curve that was generated at the supplier management server 150 at block 625 for the particular lot of radiation-sensitive film (e.g., LOT: "ABC-123456" of FIG. 2), can be obtained (e.g., downloaded) to a measurement device (e.g., measurement device 120) at the client site via the user device 110 and network 102.

A second radiation-sensitive film is exposed to an unknown dose of radiation at block 645. The second radiation-sensitive film is selected from the same lot/box as the first radiation-sensitive film that the calibration curve was generated for. For example, unknown doses of radiation such as X-ray, gamma ray, electrons, and neutrons, are delivered to the second radiation-sensitive film.

A second set of radiation data of the second radiation-sensitive film is determined based on the calibration curve at block 650. For example, the second set of radiation data of the second radiation-sensitive film is measured with measurement device 120, and a dose exposure level for the second radiation-sensitive film is determined based on comparing the second set of radiation data with the calibration curve, as illustrated and discussed herein with Reference to FIG. 4.

The second set of radiation data of the second radiation-sensitive film is provided for display on the user device at block 655. For example, the user device 110 displays the determined radiation results after applying the calibration curve the measurement results.

Data transfer of the second set of radiation data of the second radiation-sensitive film and the calibration curve to a data management system is enabled at block 660. For example, the user device 110 can transfer the calibration curve data and/or the second set of radiation data of the second radiation-sensitive film to the calibration data management server 130. The calibration data management server 130 is configured to store the calibration curve(s) in the calibration data database 140. In some implementations, the calibration curve information can be evaluated by calibration data management server 130 for "consistency" of film performance and radiation exposure at the customer level to generate process control chart-type information on the process. In particular, the information can contribute in developing better process analytics.

FIG. 7 is a flowchart of an example process 700 for determining a calibration curve based on Raman spectroscopy and determining radiation dose exposure level for an unknown dose based on the calibration curve, according to embodiments of the invention. Operations of the process 700 can be implemented, for example, by a system that includes one or more data processing apparatus, such as user device 110, measurement device 120, and calibration data management server 130 of FIG. 1.

A first radiation-sensitive film is appropriated at block 710. For example, a user (e.g., an X-ray technician) opens a new lot of radiation-sensitive film and chooses one radiation sensitive film to use as the calibration film for the remaining film in the lot. For example, the user may use the same lot of film at a later date.

The first radiation-sensitive film is then exposed to a series of known doses of radiation at block 720. For example, this aged film is then tested and exposed to known doses of high energy radiation such as X-ray, gamma ray, electrons, and neutrons, are delivered to the first radiation-sensitive film (e.g., the user selected film to be used for calibration).

A first set of radiation data of the first radiation-sensitive film is measured with a measurement device at block 730. For example, a user may use a radiation detection device, such as a Raman spectrometer device (e.g., measurement device 120 of FIG. 1) to measure the radiation data for the selected film.

A calibration curve is determined based on the first set of radiation data of the first radiation-sensitive film at a user device at block 740. For example, as illustrated in FIG. 3, calibration curve 310 may be generated by the calibration instruction set 116 at the user device 110 based on the obtained radiation data from the measurement device 120 for the selected film.

The steps for determining a calibration curve may first include selecting Raman spectral ranges based on the first set of radiation data at block 742. For example, Raman spectral ranges are selected for analysis (e.g., 2066 cm-1 (polymerization) and 1720 cm-1 (internal standard) bands). The second step for determining a calibration curve may include determining a plurality of band area ratios based on the selected Raman spectral ranges at block 744. For example, as illustrated in FIG. 3, the measurement device provides the band area ratios for each known dose of radiation given (e.g., 0-50 Gy in 5 Gy increments). The third step for determining a calibration curve may include generating the calibration curve based on plotting the band areas and ratios compared to known dose at block 746 (e.g., calibration curve 310 of FIG. 3). In some implementations, the spectral regions for a particular chemical compound should be the same, regardless of radiation type (e.g., Gamma, X-ray, visible light, etc.) However, for a different diacetylene or other appropriate radiation-sensitive compound, there may be some shift in the spectral bands that can be accounted for in the processes described herein.

A second radiation-sensitive film is exposed to an unknown dose of radiation at block 750. The second radiation-sensitive film is selected from the same lot/box as the first radiation-sensitive film that the calibration curve was generated for. For example, unknown doses of radiation such as X-ray, gamma ray, electrons, and neutrons, are delivered to the second radiation-sensitive film.

A second set of radiation-sensitive data of the second radiation-sensitive film is measured with a measurement device at block 760. For example, the second set of radiation data of the second radiation-sensitive film is measured with measurement device 120.

A dose exposure level for the second radiation-sensitive film is determined based on comparing the second set of radiation data with the calibration curve at block 770. For example, a dose exposure level for the second radiation-sensitive film is determined based on comparing the second set of radiation data with the calibration curve, as illustrated and discussed herein with Reference to FIG. 4.

The second set of radiation data of the second radiation-sensitive film is provided for display on the user device at block 780. For example, the user device 110 displays the determined radiation results after applying the calibration curve the measurement results.

For an aged film, the process can be repeated, but in a simplified manner. In this case, an unexposed film at block 710 is evaluated by Raman spectral measurement ranges based on the first set of radiation data at block 742. For example, Raman spectral ranges are selected for analysis (e.g., 2066 cm-1 (polymerization) and 1720 cm-1 (internal standard) bands). Then measuring one known dose at block 720. Then mathematically adjusting the calibration curve previously determined in block 746 when the film was first tested, thereby reflecting any changes in the aged film.

Data transfer of the second set of radiation data of the second radiation-sensitive film and the calibration curve to a data management system is enabled at block 790. For example, the user device 110 can transfer the calibration curve data and/or the second set of radiation data of the second radiation-sensitive film to the calibration data management server 130. The calibration data management server 130 can then store the calibration curve(s) in the calibration data database 140.

The dose response of radiochromic films can be dependent upon the energy level of the applied radiation. This effect is known as energy dependence. For example, it is possible to apply X-ray beams in the kilovoltage range to the megavoltage range. Consequently, correction factors may be applied to the measured film response, in this case calibration curves and/or second film measurements, to compensate for potential differences in the calibration and measurement film response to different exposure energies.

FIG. 8 is a flowchart of an example process 800 for determining a calibration curve based on Raman spectroscopy and determining radiation dose exposure level for an unknown dose based on the calibration curve at a user device, according to embodiments of the invention. Operations of the process 800 can be implemented, for example, by a system that includes one or more data processing apparatus, such as user device 110 and measurement device 120 of FIG. 1. The process 800 can also be implemented by instructions stored on computer storage medium, where execution of the instructions by a system that includes a data processing apparatus cause the data processing apparatus to perform the operations of the process 800 (e.g., application 112 running on user device 110).

A first set of radiation data for a first radiation-sensitive film is received from a measurement device at block 810. For example, a user (e.g., an X-ray technician) opens a new lot of radiation-sensitive film and chooses one radiation-sensitive film to use as the calibration film for the remaining film in the lot and then known doses of high energy radiation such as X-ray, gamma ray, electrons, and neutrons, are delivered to the first radiation-sensitive film (e.g., the user selected film to be used for calibration). Then a user may use a radiation detection device, such as a Raman spectrometer device (e.g., measurement device 120 of FIG. 1) to measure the radiation data for the selected film, and that data is then sent to the user device 110.

Raman spectral ranges are selected based on the first set of radiation data at block 820. For example, the calibration instruction set 116 on the user device 110 selects Raman spectral ranges for analysis (e.g., 2066 cm-1 (polymerization) and 1720 cm-1 (internal standard) bands).

A plurality of band area ratios are determined based on the selected Raman spectral ranges at block 830. For example, as illustrated in FIG. 3, the measurement device provides the band area ratios for each known dose of radiation given (e.g., 0-50 Gy in 5 Gy increments).

A calibration curve associated with the first radiation-sensitive film is generated based on plotting the band areas and ratios compared to known dose at block 840 (e.g., calibration curve 310 of FIG. 3).

A second set of radiation data for a second radiation-sensitive film is obtained from the measurement device at block 850. For example, unknown doses of radiation such as X-ray, gamma ray, electrons, and neutrons, are delivered to the second radiation-sensitive film, and radiation data of the second radiation-sensitive film is measured with measurement device 120.

A dose exposure level for the second radiation-sensitive film is determined based on comparing the second set of radiation data with the calibration curve at block 860. For example, a dose exposure level for the second radiation-sensitive film is determined based on comparing the second set of radiation data with the calibration curve, as illustrated and discussed herein with Reference to FIG. 4.

FIGS. 5-8 illustrate flowcharts for example techniques for implementing a radiation dosimetry calibration process based on techniques described herein. In particular, FIG. 5 is an example process 500 for a user-defined calibration approach (e.g., determining a calibration curve at a user device 110). FIG. 6 is an example process 600 for a supplier defined calibration approach (e.g., determining a calibration curve at a supplier management server 150). FIG. 7 is an example process 700 for determining a calibration curve. FIG. 8 is an example process 800 for implementing instructions stored on computer storage medium at a device for determining a calibration curve (e.g., determining a calibration curve at a user device 110). These and other embodiments can each optionally include one or more of the following features.

In some embodiments, the one or more measurement device(s) 120 may include a radiation measurement device that is capable of measuring radiation exposure. In the exemplary embodiment, the one or more measurement device(s) 120 are Raman spectrometers, such as a portable Raman spectroscopic device. In some embodiments, a measurement device 120 is a Raman spectroscopic device capable of continuous or semi-continuous in-situ monitoring of the radiation-sensitive film.

In some embodiments, the one or more measurement device(s) 120 are capable of measuring dose response characteristics that include a wide range of doses (e.g., less than 1,000 Gy). For example, some example dose ranges for the one or more measurement device(s) 120 may include: 0.2-10 Gy, 0.4-40 Gy, 1-100 Gy, 10-1,000 Gy, and the like. The example dose ranges may be applied for different radiation exposure applications such as patient dosimetry for an intensity-modulated radiation therapy (IMRT) plan verification, patient dosimetry for stereotactic radiosurgery (SRS) and stereotactic radiotherapy (SRT), routine machine quality assurance such as radiation field/light field testing, and/or other applications measuring medium to high dose based on particular patient dosimetry needs. In some embodiments, the one or more measurement device(s) 120 are capable of measuring dose response characteristics that include a larger amount of radiation (e.g., up to 400 kGy).

In some embodiments, the one or more measurement device(s) 120 measure radiation data for the radiation-sensitive film 125 from doses of radiation onto the radiation-sensitive film that are based on X-rays. Alternatively, the one or more measurement device(s) 120 measure radiation data for the radiation-sensitive film 125 from doses of radiation that are based on Gamma rays, ultraviolet light rays, visible light, electron beam, or combinations thereof.

In some embodiments, the one or more measurement device(s) 120 measure radiation data for the radiation-sensitive film 125 (e.g., via Raman spectroscopy) based on a one-dimensional resonance Raman (1DRR) spectroscopy scan, a two-dimensional resonance Raman (2DRR) spectroscopy scan, a three-dimensional resonance Raman (3DRR) spectroscopy scan, or a combination thereof.

In some embodiments, the selected Raman spectral ranges include data that does not fluctuate with radiation exposure and functions as an internal standard. For example, the use of an internal standard provides for a known concentration of a substance that is present in every sample. The use of an internal standard provides for a known concentration of a substance that is present in every sample. Enabling the reduction, or elimination, of variability due in film composition, physical differences and condition. Using an internal standard may enable the reduction, or elimination, of variability due in film composition, physical differences and condition, and the like.

In some embodiments, the radiation-sensitive film includes a radiation-sensitive compound capable of detecting a radiation dose sensitive to Raman spectroscopy. For example, each respective piece of film would include the same compound, i.e., from the same "lot" of film. In some implementations, the compound in the radiation-sensitive film is a diacetylene compound. In some implementations, the diacetylene compound is a metal or metaloid-based diacetylene compound. Alternatively, in some implementations, the diacetylene compound the diacetylene compound is a lithium-based diacetylene compound. As used herein, radiation-sensitive film may refer to a one piece or sheet of radiation-sensitive film, or radiation-sensitive film may refer to a box/lot of radiation-sensitive film (e.g., a plurality of sheets of radiation-sensitive film). In some embodiments, the radiation-sensitive film includes an assembly that includes a lot number, a bar code, and an optionally applied adhesive suitable for Raman dosimetry measurements.

In some embodiments, the characteristics for the radiation-sensitive film may change slightly over time, thus the calibration curve may need to be adjusted with a "correction factor" to better align the dose measurement to compensate for energy dependence of the film response. Thus, in some embodiments, the processes described herein may include a calibration curve adjustment process that includes obtaining a third radiation-sensitive film, measuring a before exposure data point for the third radiation-sensitive film with the measurement device, exposing the third radiation-sensitive film to one known dose of radiation, measuring an after-exposure data point for the third radiation-sensitive film with the measurement device, and adjusting the calibration curve based on the before-exposure data point and the after-exposure data point for the third radiation-sensitive film.

Figure 9:
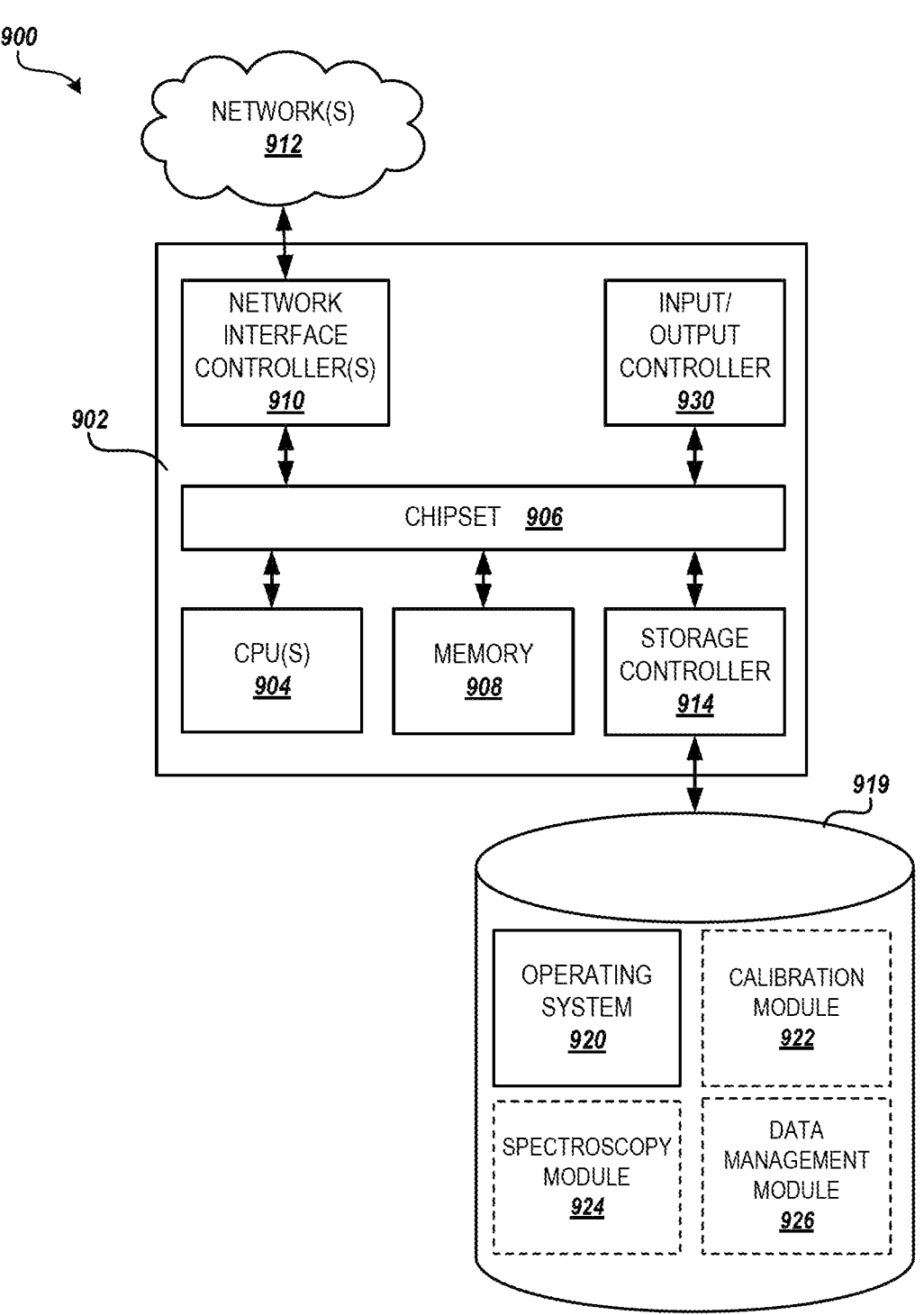
FIG. 9 is a block diagram showing an example computer architecture for a computer capable of executing the software components described herein, according to embodiments described herein.

FIG. 9 illustrates an example computer architecture 900 for a computer 902 capable of executing the software components described herein for the sending/receiving and processing of tasks. The computer architecture 900 (also referred to herein as a "server") shown in FIG. 9 illustrates a server computer, workstation, desktop computer, laptop, a server operating in a cloud environment, or other computing device, and may be utilized to execute any aspects of the software components presented herein described as executing on a host server, or other computing platform. The computer 902 preferably includes a baseboard, or "motherboard," which is a printed circuit board to which a multitude of components or devices may be connected by way of a system bus or other electrical communication paths. In one illustrative embodiment, one or more central processing units (CPUs) 904 operate in conjunction with a chipset 906. The CPUs 904 can be programmable processors that perform arithmetic and logical operations necessary for the operation of the computer 902.

The CPUs 904 preferably perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 906 provides an interface between the CPUs 904 and the remainder of the components and devices on the baseboard. The chipset 906 may provide an interface to a memory 908. The memory 908 may include a random-access memory (RAM) used as the main memory in the computer 902. The memory 908 may further include a computer-readable storage medium such as a read-only memory (ROM) or non-volatile RAM (NVRAM) for storing basic routines that help to startup the computer 902 and to transfer information between the various components and devices. The ROM or NVRAM may also store other software components necessary for the operation of the computer 902 in accordance with the embodiments described herein.

According to various embodiments, the computer 902 may operate in a networked environment using logical connections to remote computing devices through one or more networks 912, a local-area network (LAN), a wide-area network (WAN), the Internet, or any other networking topology known in the art that connects the computer 902 to the devices and other remote computers. The chipset 906 includes functionality for providing network connectivity through one or more network interface controllers (NICs) 910, such as a gigabit Ethernet adapter. For example, the NIC 910 may be capable of connecting the computer 902 to other computer devices in the utility provider's systems. It should be appreciated that any number of NICs 910 may be present in the computer 902, connecting the computer to other types of networks and remote computer systems beyond those described herein.

The computer 902 may be connected to at least one mass storage device 918 that provides non-volatile storage for the computer 902. The mass storage device 918 may store system programs, application programs, other program modules, and data, which are described in greater detail herein. The mass storage device 918 may be connected to the computer 902 through a storage controller 914 connected to the chipset 906. The mass storage device 918 may consist of one or more physical storage units. The storage controller 914 may interface with the physical storage units through a serial attached SCSI (SAS) interface, a serial advanced technology attachment (SATA) interface, a fiber channel (FC) interface, or other standard interface for physically connecting and transferring data between computers and physical storage devices.

The computer 902 may store data on the mass storage device 918 by transforming the physical state of the physical storage units to reflect the information being stored. The specific transformation of physical state may depend on various factors, in different embodiments of the invention of this description. Examples of such factors may include, but are not limited to, the technology used to implement the physical storage units, whether the mass storage device 918 is characterized as primary or secondary storage, or the like. For example, the computer 902 may store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 902 may further read information from the mass storage device 918 by detecting the physical states or characteristics of one or more particular locations within the physical storage units.

The mass storage device 918 may store an operating system 920 utilized to control the operation of the computer 902. According to some embodiments, the operating system includes the LINUX operating system. According to another embodiment, the operating system includes the WINDOWS® SERVER operating system from MICROSOFT Corporation of Redmond, Wash. According to further embodiments, the operating system may include the UNIX or SOLARIS operating systems. It should be appreciated that other operating systems may also be utilized (e.g., JAVA, Python, or other software, especially software suitable for mobile or portable devices). The mass storage device 918 may store other system or application programs and data utilized by the computer 902, such as calibration module 922 (e.g., calibration instruction set 116) to perform the radiation dosimetry calibration process, a spectroscopy module 924 (e.g., spectroscopy instruction set 114) to integrate and/or communicate with a measurement device (e.g., measurement device 120), and a data management module 928 (e.g., data management instruction set 114) to communicate calibration results with a calibration data management server as part of the dosimetry calibration process, according to embodiments described herein. Other system or application programs and data utilized by the computer 902 may be provided as well (e.g., a security module, a payment processing module, a user interface module, etc.).

In some embodiments, the mass storage device 918 may be encoded with computer-executable instructions that, when loaded into the computer 902, transforms the computer 902 from being a general-purpose computing system into a special-purpose computer capable of implementing the embodiments described herein. These computer-executable instructions transform the computer 902 by specifying how the CPUs 904 transition between states, as described above. According to some embodiments, the mass storage device 918 stores computer-executable instructions that, when executed by the computer 902, perform portions of the process 500, 600, 700, and/or 800 for implementing a dosimetry calibration system, as described herein. In further embodiments, the computer 902 may have access to other computer-readable storage medium in addition to or as an alternative to the mass storage device 918.

The computer 902 may also include an input/output controller 930 for receiving and processing input from a number of input devices, such as a keyboard, a mouse, a touchpad, a touch screen, an electronic stylus, or other type of input device. Similarly, the input/output controller 930 may provide output to a display device, such as a computer monitor, a flat-panel display, a digital projector, a printer, a plotter, or other type of output device. It will be appreciated that the computer 902 may not include all of the components shown in FIG. 9, may include other components that are not explicitly shown in FIG. 9, or may utilize an architecture completely different than that shown in FIG. 9.

It is to be understood that the present disclosure is not limited in its application to the details of construction and the arrangement of the components or steps or methodologies set forth in the following description or illustrated in the drawings. The present disclosure is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the present disclosure shall have the meanings that are commonly understood by those of ordinary skill in the art. Further, unless otherwise required by context, singular terms shall include pluralities and plural terms shall include the singular.

All of the articles and/or methods disclosed herein can be made and executed without undue experimentation in light of the present disclosure. While the articles and methods of the present disclosure have been described in terms of preferred embodiments, it will be apparent to those of ordinary skill in the art that variations can be applied to the articles and/or methods and in the steps or in the sequence of steps of the method(s) described herein without departing from the concept, spirit and scope of the present disclosure. All such similar substitutes and modifications apparent to those skilled in the art are deemed to be within the spirit, scope and concept of the present disclosure.

As utilized in accordance with the present disclosure, the following terms, unless otherwise indicated, shall be understood to have the following meanings.

The use of the word "a" or "an" when used in conjunction with the term "comprising" can mean "one," but it is also consistent with the meaning of "one or more," "at least one," and "one or more than one." The use of the term "or" is used to mean "and/or" unless explicitly indicated to refer to alternatives only if the alternatives are mutually exclusive, although the disclosure supports a definition that refers to only alternatives and "and/or." Throughout this application, the term "about" is used to indicate that a value includes the inherent variation of error for the quantifying device, the method(s) being employed to determine the value, or the variation that exists among the study subjects. For example, but not by way of limitation, when the term "about" is utilized, the designated value can vary by plus or minus twelve percent, or eleven percent, or ten percent, or nine percent, or eight percent, or seven percent, or six percent, or five percent, or four percent, or three percent, or two percent, or one percent. The use of the term "at least one" will be understood to include one as well as any quantity more than one, including but not limited to, 1, 2, 3, 4, 5, 10, 15, 20, 30, 40, 50, 100, etc. The term "at least one" can extend up to 100 or 1000 or more depending on the term to which it is attached. In addition, the quantities of 100/1000 are not to be considered limiting as lower or higher limits can also produce satisfactory results. In addition, the use of the term "at least one of X, Y, and Z" will be understood to include X alone, Y alone, and Z alone, as well as any combination of X, Y, and Z. The use of ordinal number terminology (i.e., "first", "second", "third", "fourth", etc.) is solely for the purposes of differentiating between two or more items and, unless otherwise stated, is not meant to imply any sequence or order or importance to one item over another or any order of addition.

References herein to "one embodiment," or "one aspect" or "one version" or "one objective" or "another embodiment," or "another aspect" or "another version" or "another objective" of the invention can include one or more of such embodiment, aspect, version or objective, unless the context clearly dictates otherwise.

The term "at least one" refers to one as well as any quantity more than one, including but not limited to, 1, 2, 3, 4, 5, 10, 15, 20, 30, 40, 50, 100, etc. The term "at least one" can extend up to 100 or 1000 or more depending on the term to which it is attached.

All percentages, parts, proportions, and ratios as used herein are by weight of the total composition, unless otherwise specified. All such weights as they pertain to listed ingredients are based on the active level and therefore do not include solvents or by-products that can be included in commercially available materials, unless otherwise specified.

All references to singular characteristics or limitations of the present invention shall include the corresponding plural characteristics or limitations, and vice-versa, unless otherwise specified or clearly implied to the contrary by the context in which the reference is made.

Numerical ranges as used herein are intended to include every number and subset of numbers contained within that range, whether specifically disclosed or not. Further, these numerical ranges should be construed as providing support for a claim directed to any number or subset of numbers in that range.

As used herein, the words "comprising" (and any form of comprising, such as "comprise" and "comprises"), "having"

(and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The terms "or combinations thereof" and "and/or combinations thereof" as used herein refer to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more items or terms, such as BB, AAA, AAB, BBC, AAABCCCC, CBBAAA, CABABB, and so forth. The skilled artisan will understand that typically there is no limit on the number of items or terms in any combination, unless otherwise apparent from the context.

For purposes of the following detailed description, other than in any operating examples, or where otherwise indicated, numbers that express, for example, quantities of ingredients used in the specification and claims are to be understood as being modified in all instances by the term "about". The numerical parameters set forth in the specification and attached claims are approximations that can vary depending upon the desired properties to be obtained in carrying out the invention.

The term "or combinations thereof", "and combinations thereof", and "combinations thereof" as used herein refers to all permutations and combinations of the listed items preceding the term.

The term "about" refers to a range of values +10% of a specified value. For example, the phrase "about 200" includes ±10% of 200, or from 180 to 220.

The term "dosimeter" refers to a radiation-sensitive dosimeter which is a device, instrument or system that measures or evaluates, either directly or indirectly, the quantities exposure, kerma, absorbed dose or equivalent dose, or their time derivatives (rates), or related quantities of ionizing radiation. A dosimeter is one such device used to indicate or measure exposure to ionizing radiation. It is a solid object either available as a plate, or in any other shape that can be easily viewed and sometimes shows visual transformation of color without the use of a spectrophotometer. Several types of dosimeters such as Thermoluminescence Dosimeters (TLD), Optically Simulated Luminescence (OSL), Radio Luminescence Glass (RLG), X-ray film, and Track Etch are currently available in the market. Typically, these are used for measuring and monitoring both medical and industrial radiations such as X-rays, gamma rays, high speed electrons, etc. A dosimeter along with its reader is referred to as a dosimetry system.

The term "portable Raman spectroscopic device" refers to a handheld Raman spectrometer preferably with 785 nm laser excitation. The handheld Raman spectrometer maintains connection to cloud via a cellular link even when WiFi is not available. The cloud data platform allows the user to share all data on its local device with a central database, and to synchronize instant updates on all devices.

As used herein, the term "data" refers to any information that can be stored within a memory. For example, data may include user data, sample data, radiation dosage information, control information, and so on.

In the present disclosure the term "radiation" refers to ionizing or non-ionizing radiation that carries enough energy to liberate electrons from atoms or molecules, thereby ionizing them. Radiation may include, but is not limited to, X-rays, y rays, electrons, protons, neutrons, ions, or any combination thereof. Non-ionizing radiation refers to any type of electromagnetic radiation that does not carry enough energy per quantum (photon energy) to ionize atoms or molecules, that is, to completely remove an electron from an atom or molecule. Non-ionizing radiation may include, but is not limited to, ultraviolet (UV), visible, or infrared (IR) light, or any combination thereof.

The term "ionizing radiation" as used herein generally refers to radiation with a level of energy that is high enough to cause atoms to lose electrons and become charged or ionized. Ionizing radiation may be in the form of high energy particles, like alpha and beta particles, protons and neutrons, or in the form of electromagnetic waves, like gamma rays or X-rays. High energy particles and electromagnetic waves are released from the nuclei of radioactive atoms that are decaying or may be created by causing accelerated electrons to strike a metal target.

The term "radiation-sensitive film" refers to a radiochromic dosimetry film designed for the quantitative measurement of absorbed dose of high-energy photons. Key technical features include: (i) dynamic dose range: 10 Gy to 1000 Gy, (ii) develops in real time without post-exposure treatment; (iii) energy-dependence: minimal response difference from 100 keV into the MV range; (iv) near tissue equivalent; (v) high spatial resolution—can resolve features to 5 ppm, or less; (vi) active coating exposed for detection of low energy photon and electron; (vii) proprietary new technology incorporating a marker dye in the active layer: enables non-uniformity correction by using triple-channel dosimetry and decreases UV/light sensitivity; and (viii) stable at temperatures up to 60° C.

The term "display device" refers to an arrangement of elements that allow for the visible representation of data on a display screen. Suitable display screens can include various flat, curved or otherwise-shaped screens, films, sheets or other structures for displaying information visually to a user. Display devices described herein can be included in, for example, display systems encompassing a liquid crystal display (LCD), televisions, computers, mobile phones, smart phones, personal digital assistants (PDAs), electronic reading devices, tablets, wearable devices and the like.

An "operable connection" (or a connection by which entities are "operably connected") is one in which signals, physical communication flow, and/or logical communication flow may be sent and/or received. Usually, an operable connection includes a physical interface, an electrical interface, and/or a data interface, but it is to be noted that an operable connection may consist of differing combinations of these or other types of connections sufficient to allow operable control.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically includes computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A radiation dosimetry method comprising:
obtaining a first radiation-sensitive film;
exposing the first radiation-sensitive film to a series of known doses of radiation;
measuring a first set of radiation data for the first radiation-sensitive film with a measurement device; and
determining a calibration curve based on the first set of radiation data for the first radiation-sensitive film at a user device by:
(a) selecting Raman spectral ranges based on the first set of radiation data;
(b) determining a plurality of band area ratios based on the selected Raman spectral ranges; and
(c) generating the calibration curve based on plotting the band areas and ratios compared to a known dose.

2. The method of claim 1, further comprising:
exposing a second radiation-sensitive film to an unknown dose of radiation;
measuring a second set of radiation data for the second radiation-sensitive film with the measurement device; and
determining a dose exposure level for the second radiation-sensitive film by comparing the second set of radiation data with the calibration curve.

3. The method of claim 2, further comprising:
transferring, by the user device, the calibration curve and the second set of radiation data for the second radiation-sensitive film to a data management system.

4. The method of claim 2, further comprising:
providing the radiation dose exposure level of the second radiation-sensitive film for display on the user device.

5. The method of claim 1, wherein the selected Raman spectral ranges include data that does not fluctuate with radiation exposure and functions as an internal standard.

6. The method of claim 1, wherein a correction factor is applied to generating the calibration curve to compensate for energy dependence.

7. The method of claim 1, further comprising:
obtaining a third radiation-sensitive film;
measuring a before-exposure data point for the third radiation-sensitive film with the measurement device;
exposing the third radiation-sensitive film to one known dose of radiation;
measuring an after-exposure data point for the third radiation-sensitive film with the measurement device; and adjusting the calibration curve based on the before-exposure data point and the after-exposure data point for the third radiation-sensitive film.

8. The method of claim 1, wherein the measurement device is a Raman spectroscopic device.

9. The method of claim 8, wherein the Raman spectroscopic device is portable.

10. The method of claim 8, wherein the Raman spectroscopic device capable of continuous or semi-continuous in-situ monitoring of the radiation-sensitive film.

11. The method of claim 1, wherein the measurement device measures the first set of radiation data for the first radiation-sensitive film based on at least one of:

a one-dimensional resonance Raman (1DRR) spectroscopy scan, a two-dimensional resonance Raman (2DRR) spectroscopy scan, and/or a three-dimensional resonance Raman (3DRR) spectroscopy scan.

12. The method of claim 1, wherein the first radiation-sensitive film and the second radiation-sensitive film comprise a radiation-sensitive compound capable of detecting a radiation dose sensitive to Raman spectroscopy.

13. The method of claim 12, wherein the radiation-sensitive compound is a diacetylene compound.

14. The method of claim 13, wherein the diacetylene compound is a metal or metaloid-based diacetylene compound.

15. The method of claim 13, wherein the diacetylene compound is a lithium-based diacetylene compound.

16. The method of claim 1, wherein the measurement device is capable of measuring dose response characteristics that are less than 1000 Gy.

17. The method of claim 1, wherein the measurement device is capable of measuring dose response characteristics that are less than 400 kGy.

18. The method of claim 1, wherein the series of known doses of radiation is based on X-rays.

19. The method of claim 1, wherein the series of known doses of radiation is based on Gamma rays.

20. The method of claim 1, wherein the series of known doses of radiation is based on ultraviolet light rays, visible light, electron beam, or combinations thereof.

21. The method of claim 1, wherein the first radiation-sensitive film and/or the second radiation-sensitive film comprises an assembly that includes a lot number, a bar code, and an optionally applied adhesive suitable for Raman dosimetry measurements.

22. A method comprising:

at a device having a processor:

receiving a first set of radiation data for a first radiation-sensitive film from a measurement device, wherein the first radiation-sensitive film was exposed to a series of known doses of radiation;

selecting Raman spectral ranges based on the first set of radiation data;

determining a plurality of band area ratios based on the selected Raman spectral ranges;

generating a calibration curve associated with the first radiation-sensitive film based on plotting the band areas and ratios compared to a known dose of radiation;

obtaining a second set of radiation data for a second radiation-sensitive film from the measurement device, wherein the second radiation-sensitive film was exposed to an unknown dose of radiation; and determining a dose exposure level for the second radiation-sensitive film based on comparing the second set of radiation data with the calibration curve.

23. A radiation dosimetry method comprising:

obtaining a first radiation-sensitive film, a second radiation-sensitive film, and a third radiation-sensitive film;

exposing the first radiation-sensitive film to a series of known doses of radiation;

measuring a first set of radiation data for the first radiation-sensitive film with a measurement device;

determining a calibration curve based on the first set of radiation data for the first radiation-sensitive film at a user device by:

(a) selecting Raman spectral ranges based on the first set of radiation data;

(b) determining a plurality of band area ratios based on the selected Raman spectral ranges; and (c) generating the calibration curve based on plotting the band areas and ratios compared to a known dose;

exposing the second radiation-sensitive film to an unknown dose of radiation;

measuring a second set of radiation data for the second radiation-sensitive film with the measurement device;

determining a dose exposure level for the second radiation-sensitive film by comparing the second set of radiation data with the calibration curve;

measuring a before-exposure data point for the third radiation-sensitive film with the measurement device;

exposing the third radiation-sensitive film to one known dose of radiation;

measuring an after-exposure data point for the third radiation-sensitive film with the measurement device;

transferring, by the user device, the calibration curve, the second set of radiation data for the second radiation-sensitive film, and the before-exposure and after-exposure data points for the third radiation-sensitive film to a data management system; and providing the radiation dose exposure levels of the second and third radiation- sensitive films for display on the user device.

24. An integrated product for measuring and analyzing radiation dosimetry, comprising:

a Raman spectroscopic device;

a radiation-sensitive dosimeter;

an interfacing product with a display device; and a storage medium.

25. The integrated product of claim 24, wherein the Raman spectroscopic device comprises a portable Raman spectroscopic device.

26. The integrated product of claim 24, wherein the storage medium comprises at least one member selected from a database and a computer readable storage media.

27. The integrated product of claim 26, wherein the storage medium comprises a computer readable storage media comprising at least one member selected from the group consisting of random access memory, read-only memory, erasable programmable read- only memory, electrically erasable programmable read-only memory, flash memory or other solid state memory technology, portable compact disc read-only memory, or other optical storage, magnetic cassettes, magnetic tape, magnetic disk storage or other magnetic storage devices, and any other medium that can be used to store the desired information that can be read by a computer.

28. The integrated product of claim 26, wherein the storage medium comprises a database comprising at least one member selected from the group consisting of a local server, a local workstation, a local desktop computer, a local laptop, a cloud-accessible, remote server, a cloud-accessible, remote workstation, a cloud-accessible, remote desktop computer, a cloud-accessible, remote laptop, a cloud-accessible remote server, and a cloud- based, remote server.

29. The integrated product of claim 24, wherein the integrated product is configured to perform the method of claim 1.

30. The integrated computer product of claim 24, wherein the integrated computer product is configured to perform the method of claim 23.

\*　\*　\*　\*　\*